(12) United States Patent
Brisebois et al.

(10) Patent No.: US 8,271,025 B2
(45) Date of Patent: Sep. 18, 2012

(54) DEVICE NETWORK TECHNOLOGY SELECTION AND DISPLAY IN MULTI-TECHNOLOGY WIRELESS ENVIRONMENTS

(75) Inventors: Arthur Brisebois, Cumming, GA (US); Sharat Chander, Woodridge, IL (US); Yung Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 975 days.

(21) Appl. No.: 12/254,704

(22) Filed: Oct. 20, 2008

(65) Prior Publication Data

US 2010/0099393 A1   Apr. 22, 2010

(51) Int. Cl.
*H04M 1/00* (2006.01)
(52) U.S. Cl. .................................... 455/552.1
(58) Field of Classification Search .................. None
See application file for complete search history.

(56) References Cited

U.S. PATENT DOCUMENTS

| | | | |
|---|---|---|---|
| 7,437,158 B2 | 10/2008 | Russell | |
| 7,818,011 B2 * | 10/2010 | Buchwald et al. | 455/450 |
| 2003/0130001 A1 * | 7/2003 | Weisshaar et al. | 455/510 |
| 2005/0119006 A1 * | 6/2005 | Cave et al. | 455/453 |
| 2006/0178918 A1 | 8/2006 | Mikurak | |
| 2007/0133482 A1 | 6/2007 | Grannan | |

FOREIGN PATENT DOCUMENTS

| | | |
|---|---|---|
| EP | 1885141 A | 2/2008 |
| WO | 2005079092 A | 8/2005 |

OTHER PUBLICATIONS

Antonio Iera, et al. An Access Network Selection Algorithm Dynamically Adapted to User Needs and Preferences. Sep. 1, 2006, Personal Indoor and Mobile Radio Communications, 2006 IEEE 17th International Symposium on, IEEE, PI, pp. 1-5, XP031023568 ISBN: 978-1-4244-0329-5 the whole document.
International Search Report and Written Opinion for International Application No. PCT/US2009/060399, mailing date Jan. 26, 2010, 59 pages.
International Search Report and Written Opinion for International Application No. PCT/US2009/060400, mailing date Jan. 27, 2010, 77 pages.
Office Action mailed Nov. 2, 2011 for U.S. Appl. No. 12/254,708, 14 pages.

* cited by examiner

*Primary Examiner* — Lincoln Donovan
*Assistant Examiner* — Khareem E Almo
(74) *Attorney, Agent, or Firm* — Turocy & Watson, LLP

(57) ABSTRACT

System(s) and method(s) are provided to manage utilization of radio network technology and display thereof when multiple services and radio network technologies are available to a multi-technology mobile device. Management relies at least in part on a subscriber profile that comprises a network selection profile constructed through market policy, subscriber policy, and application policy for radio technology utilization. Network preference(s) profile is generated on per subscriber, or per subscriber type, basis and is conveyed to a subscriber station over the air. Initial subscriber profile can be delivered at a time of provisioning a multi-technology mobile device, and updated based at least upon subscriber demand, a schedule established by a network operator or service provider, or an event related to coverage area relocation or contracted services. Radio technology preferences and display of associated technologies available to a multi-technology mobile device can be dynamically controlled on a per-call and/or per-application basis.

39 Claims, 15 Drawing Sheets

DEVICE NETWORK TECHNOLOGY SELECTION AND DISPLAY IN MULTI-TECHNOLOGY WIRELESS ENVIRONMENTS

CROSS-REFERENCE TO RELATED APPLICATION

The subject application is related to co-pending and commonly assigned, U.S. patent application Ser. No. 12/254,708, entitled "MANAGEMENT OF NETWORK TECHNOLOGY SELECTION AND DISPLAY IN MULTI-TECHNOLOGY WIRELESS ENVIRONMENTS," filed on Oct. 20, 2008. The entirety of this application is incorporated herein by reference.

TECHNICAL FIELD

The subject innovation relates to wireless communications and, more particularly, to controlling and modifying device operation, network utilization and display when multiple services and radio network technologies are available.

BACKGROUND

Wireless network service providers often deploy and support multiple technology layers within service areas. Commonly, it is incorrectly assumed that newest radio technology is always best suited to serve most all or all new and legacy voice and data services on multi-technology capable mobile devices. While such an assumption may be accurate near middle to end of a radio network technology life-cycle, it rarely is accurate at the beginning of a radio technology layer deployment. Various aspects of an initial radio technology mitigate adequate service to most all or all new and legacy services, as the following examples reveal it. (i) Initial new-technology installations may lack support for legacy capabilities. (ii) Initial new-technology deployments may be incomplete and prone to faulty operation, and may cover substantially less than the entire service area. (iii) Initial new-technology capacity may lag mobile device growth and adoption; especially in cases where new wireless devices dominate sales growth as a result of legacy devices being perceived as demode and relatively unattractive, particularly to early adopters.

From the perspective of a wireless service provider, commercial factors also affect deployment and adoption of new radio technologies, which can serve novel multi-technology devices. Uncontrollable legacy technology traffic de-growth may have substantial financial implications, and lead to business strategy changes to preserve market share, due to accelerated depreciation and writeoff of legacy equipment. To avert or control such risks, wireless network service providers often delay new radio technology launch until a commercial transition is ensured. The latter can result in additional radio technology deployment delays and costs that could be mitigated through better control of device behavior in the multi-technology wireless environments.

From the subscriber perspective, adoption and utilization of new radio technologies may is not always correlated with acquisition of multi-technology mobile devices that support new radio technologies. Subscribers with new multi-technology devices may or may not require, purchase, or benefit from services delivered through new radio network technology.

With respect to wireless devices, multi-technology mobile devices typically provide limited, if any, capabilities for customizable dynamic radio network selection. Generally, multi-technology devices posses fixed radio technology preference settings, or such settings can be adjusted on a per-operator basis, which narrows capabilities for radio network selection on a per device or per service basis. In addition, novel mobile devices are generally configured to preferentially exploit a radio network based on novel radio technology, which can lead to inefficient service provision since a novel radio technology is not necessarily best suited for a served customer or service. Moreover, in multi-technology mobile devices that support radio technology selection there is an increasing reliance upon wireless network control of and signaling to the mobile device, which can increase delays, processor load and ultimately degrade wireless network capacity. Furthermore, mobile devices that can utilize multiple technologies typically display an in-use radio technology only, which can fail to provide subscribers a rich representation of a wireless environment or service area in which the mobile device operates.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) to manage utilization of radio network technology and display thereof when multiple services and radio network technologies are available to a multi-technology mobile device. Management relies at least in part on a subscriber profile that comprises a network selection profile constructed through market policy, subscriber policy, and application policy for radio technology utilization. Network preference(s) profile is generated on per subscriber, or per subscriber type, basis and is conveyed to a subscriber station over the air. Initial subscriber profile can be delivered at a time of provisioning a multi-technology mobile device, and updated based at least upon subscriber demand, a schedule established by a network operator or service provider, or an event related to coverage area relocation or contracted services. Radio technology preferences can be dynamically controlled on a per-call and/or per-application basis.

Additionally, display of radio network technology is based at least on available radio technologies, as ascertained by a multi-technology device that operates in a multi-technology wireless environment. Once a set of one or more radio technologies are determined to be available in accordance with idle mode operation of the multi-technology mobile device, each technology in the set is displayed thereon. Thus, in an aspect of the subject innovation, multi-technology devices display in-use technology indications in addition to available radio technology, which facilitates accurate subscriber perception of supported network technology in a service area.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), High Speed Downlink Packet Access (HSDPA), High Speed Uplink Packet Access (HSUPA), or LTE Advanced. Additionally, substantially all aspects of the subject innovation can include legacy telecommunication technologies. It should be appreciated that the illustrated selections for radio technology include 2G, 3G, and 4G. However, such selection portrays an illustrative example selection and is not intended as a limitation of the subject innovation and related aspects thereof, any radio technology at substantially any deployment stage can be incorporated within the novel framework of radio technology selection set forth in the subject innovation.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
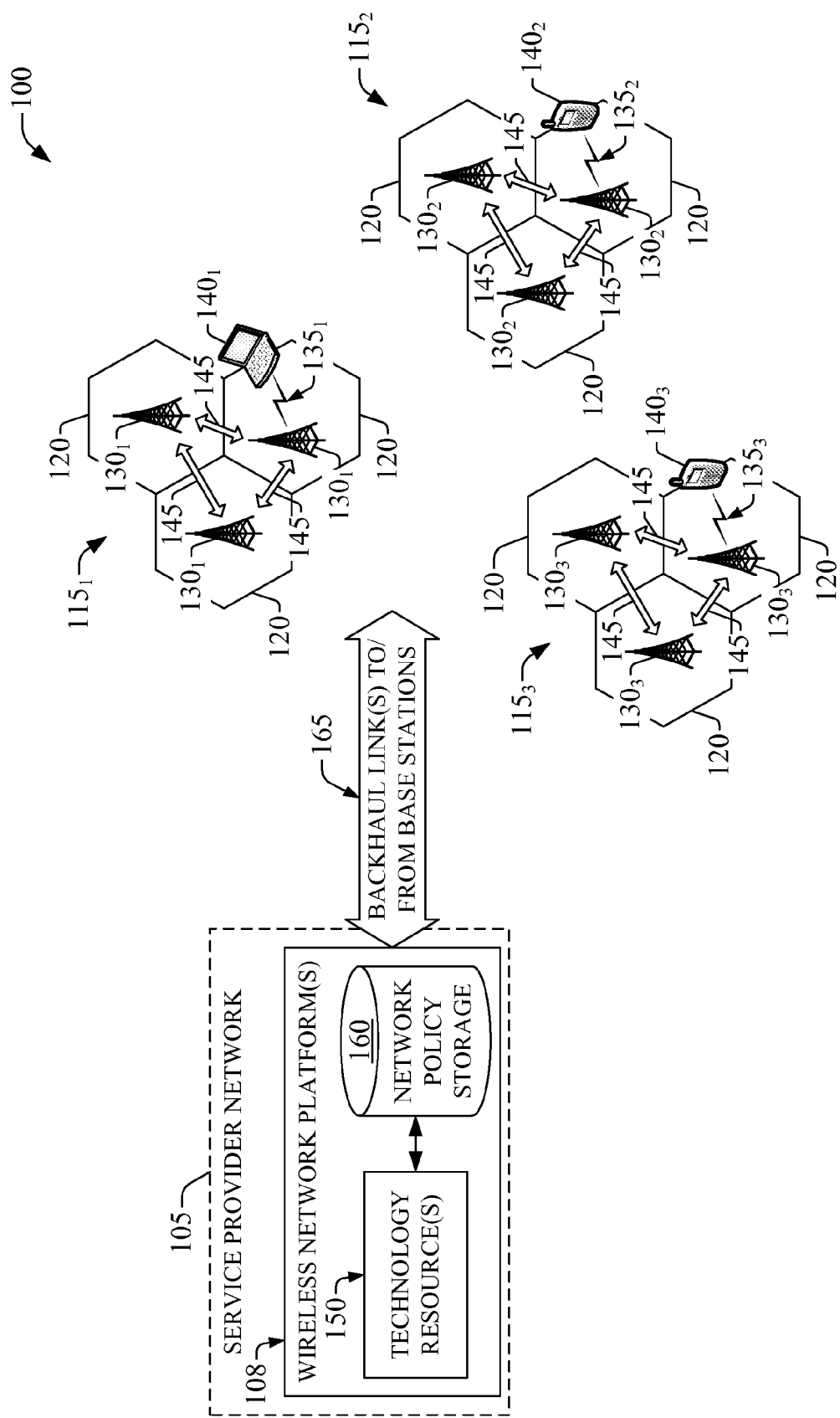
FIG. 1 illustrates an example wireless environment in which wireless coverage can be provided in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "resource," "layer," "interface," "constructor," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

As described in greater detail below, the subject innovation presents system(s) and method(s) to manage utilization of radio network technology and display thereof when multiple services and radio network technologies are available to a multi-technology mobile device. Management relies at least in part on a subscriber profile that comprises a network selection profile constructed through market policy, subscriber policy, and application policy for radio technology utilization. The network preference(s) profile is generated on a per subscriber, or per subscriber type, basis, and is conveyed to a subscriber station over the air. It is to be appreciated that a subscriber profile discriminate network technology settings in accordance to market, mode of operation, and type of application that is consumed in the mobile device. Accordingly, the subject innovation enables a flexible radio network selection mechanism at the mobile device level based upon a per subscriber and per application type basis; radio technology preferences can be dynamically controlled on a per-call and/or per-application basis.

Display of radio network technology is based at least upon available radio technologies in a wireless environment wherein a multi-technology mobile device operates: After a set of one or more radio technologies are determined to be available, each technology in the set is displayed in the mobile device. Thus, the subject innovation drive multi-technology devices to display in-use technology indications in addition to available radio technology, with the ensuing mitigation of incorrect subscriber perception of supported network technology in a service area. At least two advantages of management features, or aspects, of radio network selection and display described in the subject innovation are the following. (1) Management does not depend upon complex wireless network platform features and signaling, and the management is therefore useful for per-call implementation that in conventional systems would be impractical. As a result, wireless service providers can shift network traffic between technologies without creating excessive signaling overhead, application conflicts and incorrect network technology coverage perception by the subscriber. These advantages can mitigate delay and related costs associated with radio technology deployment through lightweight management of device behavior with respect to radio technology selection and display in a multi-technology environment. (2) Radio technology display conveys available and allowed-to-operate radio network technologies, which represents a service-provider technology support indication, instead of display of an in-use radio technology.

Referring to the drawings, FIG. 1 illustrates an example wireless environment in which wireless coverage can be provided in accordance with aspects described herein. In example wireless environment 100, a service provider network serves three markets $115_1$-$115_3$ are illustrated as a set of coverage cells 120, each cell served at least in part by a base station $130_\lambda$ ($\lambda$=1, 2, 3). It should be appreciated that each market can include more that three coverage cells. The number of cells in each market generally depends on various factors such as geography (e.g., a metropolitan statistical area (MSA) or rural statistical area (RSA)), radio technology employed for wireless communication, likelihood of adoption of wireless service by prospective subscribers in a coverage cell, availability of radio frequency (RF) bands employed for wireless coverage by service network provider 105, and so forth. Coverage cells 120 are illustrated as hexagons; however, coverage cells can adopt other geometries generally dictated by a deployment configuration or floor plan, geographic areas to be covered, and so on. An over-the-air wireless link $135_\lambda$, associated with a base station $13_\lambda$, facilitates coverage of mobile device $140_\lambda$ through transport of signal(s) and traffic, the wireless link $135_\lambda$ comprises a downlink (DL) and an uplink (UL), and it utilizes a predetermined band of the radio frequency spectrum. Disparate radio technologies utilized for wireless coverage typically utilize disparate RF bands; for instance, 3rd generation radio technology typically exploits a broader RF band than a 2 nd generation radio technology does. A radio technology can exploit RF bands that are licensed (e.g., personal communication services (PCS), advanced wireless services (AWS), general wireless communications service (GWCS), and so forth) or unlicensed (e.g., the 2.4 GHz industrial, medical and scientific (IMS) band or one or more of the 5 GHz set of bands).

Base stations $130_\lambda$ communicate mutually via backhaul pipes(s) 145, and communicate with wireless network platform(s) 108 through broadband backhaul link(s) 165. In an aspect, backhaul pipe(s) 145 and backhaul link 165 can include a wired backbone link (e.g., optical fiber backbone, twisted-pair line, T1/E1 phone line, a digital subscriber line (DSL) either synchronous or asynchronous, an asymmetric DSL, a coaxial cable . . . ), or a wireless link (e.g., a line of sight (LOS) link like a deep space link, or non-LOS wireless link). It is noted that a set of base stations, its associated electronics, circuitry or components, and a set of respective wireless links $135_\lambda$ operated in accordance to a radio technology through the base stations, form a radio access network (RAN).

Wireless network platform(s) 108 facilitates circuit switched (CS)-based (e.g., voice and data) and packet-switched (PS) (e.g., internet protocol (IP), frame relay, or asynchronous transfer mode (ATM)) traffic and signaling generation, and delivery and reception for networked telecommunication, in accordance with various radio technologies for disparate markets. In addition, wireless network platform(s) 108 control and manage base stations $130_\lambda$ in disparate markets $115_\lambda$ via, for example, a wireless network management component (e.g., a cellular gateway node). Moreover, wireless network platform(s) can integrate disparate networks (e.g., Wi-Fi network(s), femto cell network(s), broadband network(s), service network(s), enterprise network(s) . . . ) In cellular wireless technologies (e.g., 3rd Generation Partnership Project (3GPP) Universal Mobile Telecommunication System (UMTS), Global System for Mobile Communication (GSM)), wireless network platform 108 in is embodied in a core network. In an aspect of the subject innovation, to the accomplishment of wireless telecommunication and management thereof, wireless network platform(s) includes technology framework(s) 150, which comprises components, e.g., nodes, reference points, gateways, and interfaces or reference points, that operate in accordance with a specific radio technology. Disparate markets are served through one or more disparate radio technologies as provided by technology framework(s) 150. Such technologies can present disparate levels of development maturity in disparate markets. For example, (i) embryonic technology, which can be associated with experimental laboratory and field deployments in specific markets, likely associated with early adopters and premium customer segments; (ii) incipient technology with operation deployment in selected markets for selected subscriber segments; and (iii) operational with development of advanced features introduced; and mature, wherein operational development is concluded and telecommunication remains effected through a static set of features. Additionally, wireless network platform(s) 108 includes a network policy storage 160 that retains settings, or preferences, to communicate with a mobile device (e.g., user equipment 140$_3$) in accordance with at least one of a market (e.g., market 115$_3$) in which the mobile device(s) operate, a subscriber segment associated with the mobile device, or an application exploited by the mobile device. Network policy storage 160 also includes settings for device behavior with respect to display features of radio technologies available for communication.

It should be appreciated that the illustrated selections for radio technology include 2G (e.g., GSM), 3G (e.g, 3GPP UMTS, HSDPA), and 4G (e.g., Long Term Evolution (LTE) Advanced); however, such selection portrays an illustrative example selection and is not intended as a limitation of the subject innovation and related aspects thereof. Any deployed radio technology at substantially any evolution stage can be included within network selection profile(s) 286 and display profile 287.

Figure 2:
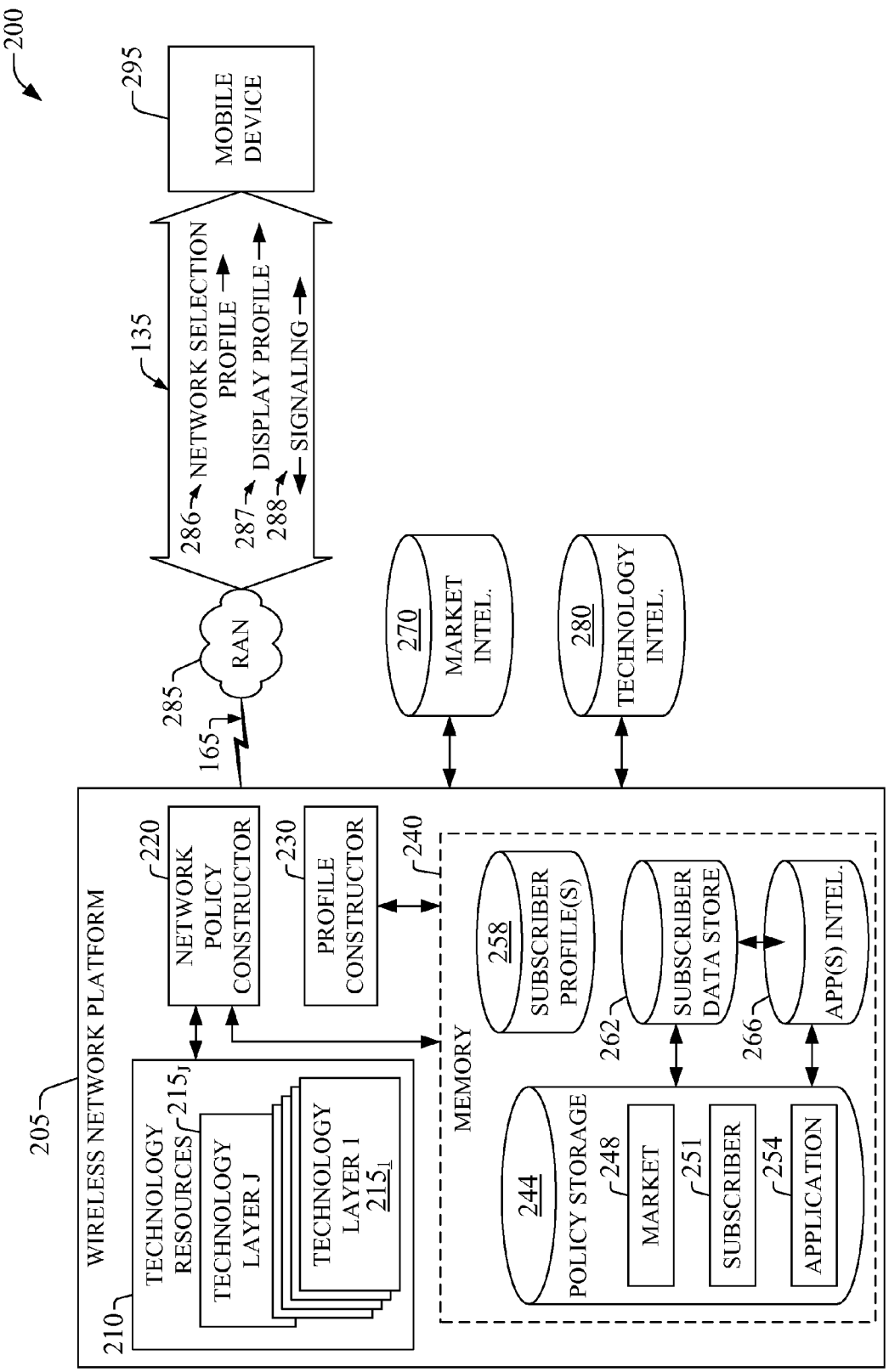
FIG. 2 is a block diagram of an example system to communicate with a multi-technology mobile station in accordance with a subscriber profile based on market, subscriber, and application policies for radio network technology utilization in accordance with aspects of the subject innovation.

FIG. 2 illustrates a block diagram of an example system 200 to communicate with a mobile station in accordance with a subscriber profile based on market, subscriber, and application policies for radio network technology utilization in accordance with aspects described herein. Wireless network platform 205 can exploit technology resources 210 to communicate wirelessly with a mobile device 295 through radio access network 285; specific operation of RAN 185 is dictated by a selected technology resource. Technology resources 155 are specific to a served market (e.g., market 115$_2$). The wireless communication is effected in accordance with a network selection profile 286, which can determine a set of radio technology preferences based at least in part upon market type, subscriber type and application type. The network selection profile 286 is conveyed to a mobile device 295 over-the-air (OTA) through a base station within RAN 285 that serves the mobile device 295. Radio technology preferences establish a utilization priority for disparate technology layers 215$_1$-215$_J$ (J is a positive integer) available within technology resources 210. For a specific market, technology layers 215$_1$-215$_J$ are developed to disparate levels, and include components that operate in accordance with technology standards. In addition, each technology layer 215$_\kappa$ ($\kappa$=1, 2 . . . J) has a set of associated components within RAN 285 that operate in accordance with corresponding standards.

Network policy constructor 220 establishes a network selection profile 286. To that end, network policy constructor 220 determines a set of policies that dictate utilization of technology resources 210 in accordance with a market, a subscriber, and application served. A first policy in the constructed set of policies is a market policy 248. Construction of this policy, via network policy constructor 220, can be based on market intelligence 270, which includes economic, competitive, financial, marketplace and other non-technical indicators. Such indicators adopt values that are rarely ubiquitous among markets. As an example, economic indicators for a market encompassing an economically thriving region (as measured through unemployment rates, housing transactions . . . ) can suggest that the region is likely to adopt latest telecommunication technology. Competitive indicators can reveal a projected or actual degree of market share for a service provider regarding a specific radio technology with respect to established or new competitors. Financial indicators can convey a level of funds available to a service provider for development and deployment of new technologies. Marketplace indicators can identify and characterize disparate consumer segments in accordance with available intelligence on current or prospective subscribers which comprise a market. In addition, marketplace can include information on geographical locus of deployment (e.g., urban, metropolitan, or rural area) which can affect service offerings viability. Moreover, it should be appreciated that marketplace factors can be affected by seasonal influences such as climatic season(s), which can affect subscriber makeup within the marketplace, as it may be the case is geographic areas the realize large mobilization of a specific subscriber segments, e.g., retirees visiting Florida or Arizona during autumn and winter. Consumer intelligence can include information that characterizes history or behavior of a consumer and records of commercial and non-commercial activities involving a purchased product or service, or a combination thereof. As an illustration, marketplace indicators can rely on subscriber intelligence such as (i) usage and type of contracted wireless plans (e.g., voice, data, voice and data; residential or business, etc.), including add-on features; (ii) demographics such as age groups, commercial transaction(s) history and associated metrics (e.g., credit history, credit score), and education level, which can reflect level of technological savvy and willingness to contract new services and mobile devices and exploit new radio technologies, and socioeconomic segment; (iii) cultural background (e.g., ethnicity, religion, cross-cultural exposure, . . . ) which can substantially favorably or detrimentally influence consumption of specific types of applications, and so on.

Market intelligence 270 can be collected by a service provider and retained within an enterprise memory platform (not shown). In addition, market policy 248 is based upon technology intelligence 280, which includes information on deployment conditions and development, or evolution, stages of technology layers 215$_\kappa$ available to wireless network platform 205 to serve a market. It should be appreciated that the level of evolution of each technology layer 215$_\kappa$ can influence coverage, capabilities, and capacity of various new and legacy network technologies.

As an example, market intelligence 270 and technology intelligence 280 can reveal that a service provider has a surplus 3rd generation (3G) telecommunication capacity (e.g., a substantive deployment of base stations with multiple antennas that facilitate multiple-input multiple output (MIMO) communication) in a market and thus wireless network platform 205 can prefer to serve most traffic through a technology layer that provides 3G telecommunication. As another example, network policy constructor 220 can determine a market has relegated development of a 3G technology resource (e.g., technology layers 215$_{J-M}$-215$_J$, with M a positive integer lesser than J) and invested substantially in 4th generation (4G) telecommunication capacity (e.g., development of protocols within the scope of 4G technology and associated standardization, as well as development of electronic circuitry and appliances that operate with such protocols). Thus, for such a market, a wireless network platform 205 can prefer 4G telecommunication to serve a subscriber.

In an aspect of the subject innovation, a market policy 248 includes a dynamically adjustable set of preference settings that convey preferences of network technology, or radio technology, to be adopted in a served mobile device 295 and utilized for wireless communication; preference settings defined and adjusted on a per-market basis. It should be appreciated that a market policy can include preference settings for multiple markets. It should further be appreciated that the dynamic nature of adjustments to radio technology preference settings can be based at least in part on scheduled events, such as market roaming, service and maintenance, or technology resources redeployment, which can include upgrades or additions to components within one or more technology layers or base stations and electronic circuitry within a RAN. It should further yet be appreciated that a number of market policies per subscriber can be dictated, at least in part, upon operational features of a served mobile device 295, associated storage capabilities (e.g., subscriber identification module (SIM) storage capabilities, universal integrated circuit card (UICC) storage capabilities, or removable user identity module (RUIM)), and mobility aspects of the subscriber like inter-market or inter-service network provider visitation history, or international roaming history. A market-specific code or token that identifies a market policy can be broadcast by wireless base stations deployed as part of a RAN (RAN 285) through signaling 288; the broadcast can proceed in accordance with one or more communication standards of the various radio technologies supported through technology resources 210.

A second policy in the constructed set of policies is a subscriber policy 251. Network policy constructor 220 can establish this policy based at least in part on information retained in subscriber data store 262. Data on subscriber(s) can reveal relationship(s) between subscriber equipment and contracted service, rate plan, and service usage that may not be straightforwardly justifiable or logical from a perspective of network technology resources 210. As an example, a subscriber may purchase a 4G mobile device for a feature that enhances user-device interaction (e.g., touch-based gestures to command the mobile device), instead of substantive data rates or speed germane to 4G radio technology. Particularly, such illustrative subscriber may consume wireless services that are better served on 3G or 2G. Each subscriber, or subscriber segment or type, can be associated at the wireless network platform level with a dynamically adjustable set of desired network technology, or radio technology preferences to be adopted in a mobile device 295. Such set of preference settings can facilitate substantially maximum network efficiency, which is typically achieved when subscriber usage is served through a most suitable network technology resources 210. Utilization of substantially optimal technology layers $215_K$ to serve a subscriber can mitigate unnecessary bandwidth occupation, excessive signaling, and so forth.

In an aspect, to achieve a subscriber policy that promotes substantially optimal wireless network platform performance during a telecommunication, the set of radio technology preference setting(s) and associated network selection behavior can be based upon at least one of a subscriber rate plan(s), or a service level agreement(s) (e.g., guaranteed bitrate, minimum/maximum bitrate, average bitrate, DL or UL bit error rate(s), packet error rate(s), or block error rate(s); DL or UL packet loss rate; link loss/recovery rate, traffic delay or latency . . . ) and resulting quality of service (QoS) expectations, which are a part of subscriber perceived service experience.

In addition, a subscriber policy can be linked to a display profile 287 delivered OTA to mobile device 295 that conveys technology indicator(s), or descriptor(s), which controls display of available technology resources for communication to a subscriber that utilizes mobile device 295. In an aspect, profile constructor can establish a display profile based at least in part upon technology intelligence 280. It is to be noted that conventional wireless communication networks direct mobile device(s) to render in-use radio technology rather than radio technology(ies) available to the mobile device(s). In another aspect, an end-user perception of value-added can be influenced and modulated through radio technology indicators to be displayed in a mobile device 295. In yet another aspect, display profile 287 can be independent of the market (e.g., market $115_\lambda$) in which mobile device 295 operates.

A third policy in the constructed set of policies is an application policy 254. Network policy constructor 220 can determine such policy based at least in part on information retained in application intelligence 266. Applications can include applications present in a set of server(s) installed within wireless network platform 205, or data services provided by external networks (not shown). Application intelligence 266 can include information on configuration of application pushed to a served wireless station like mobile device 295, such information can be acquired during provisioning or an update of the served wireless device. Additionally, application type such as voice only, data only, or voice and data; application character like circuit-switched (CS) traffic or packet-switched (PS) traffic; application requirements such as maximum tolerated delay(s), degree of data integrity like tolerated packet loss, and so forth. Moreover, historic information on the frequency and type of applications primarily utilized by an end user of the served wireless device can be included in application intelligence 266; for instance, such information can be collected through signaling 288, when a packet data protocol (PDP) context is authorized and created via a gateway node (not shown) within wireless network platform 205. It should be appreciated that various wireless application requirements may be supported on a single or multiple network technologies (e.g., technology layers $215_1$-$215_J$) at a any specific time during operation of wireless network platform 205; a timeline can affect radio technology offerings to cover mobile device 295 as deployment of additional technology resources 210 can be implement, or development of one or more technology layers $215_K$ can be conducted. As an example, voice applications may be supported initially on 3G and 2G radio technology, as deployed technology layers $215_K$ can provide such level of coverage, and 4G, 3G and 2G at a later time after additional technology resources are deployed. As another example, voice applications, or calls, can be served via legacy CS facilities, 3G as embodied in voice over internet protocol (VoIP) over HSDPA, or 4G as embodied in LTE Advanced, as 3G and 4G become available radio technology through development and deployment of suitable technology layers $215_K$. As an alternative or additional, example, application that concomitantly delivers voice and data may be supported initially on 3G radio technology substantially exclusively, while 4G and 3G coverage can be added at a later instance of wireless network platform 205 development. As yet another example, real-time data applications with extremely substantially tight latency, or delay, requirements may be adequately served through 4G technology resources exclusively. In the subject innovation, application policy 254 includes a set of dynamically adjustable set of desired network technology, or radio technology, preference settings to be adopted in a served wireless device. For applications supportable on a single technology, a "preference setting" can be reduced to, or be represented by, an "admission flag," wherein a data service request (e.g., creation of a PDP context via signaling 288) set forth by wireless network platform or mobile device 295 can be rejected in the mobile device 295 when a required radio technology is unavailable; availability or lack thereof can be probed at the wireless device level through control scans of a radio signal environment.

Based upon network selection profile 286 and display profile 287, profile constructor 230 can compile, or establish, a subscriber profile. A simple subscriber profile may contain network selection preferences for home market (e.g., market 115₁), home provider and Roaming (e.g., markets 115₂ and 115₃). A complex subscriber profile (e.g., for a frequent traveler who visits disparate markets at a high rate) can include network selection preferences for a home market (e.g., market 115₁) and each visited market (e.g., markets 115₂ and 115₃) within a same service provider network or a disparate service network provider. Subscriber profile at the subscriber level can be identified through at least one of an international mobile subscriber identity (IMSI), an international mobile equipment identifier (IMEI), a mobile directory number (MDN), a mobile identification number (MIN), or a multi-bit identification number like the mobile identity number (MEID). It is noted that substantially any code or token that uniquely identifies a subscriber or a mobile device associated therewith can be employed to identify a subscriber profile. As an example scenario, profile constructor 230 can compile a simple initial profile that is aggregated with additional network selection preferences and technology descriptor(s) related to a visited market: Upon arrival in a new market (for example, revealed through a Location Area/Routing Area update procedure completion), an additional set of network preference settings and display profile can be created for the subscriber. Such subscriber profile(s) can be retained in a memory element 258 within memory 240. Memory element 258 can be a part of a conventional home location register (HLR), or it can reside within a memory platform external, or offline, to wireless network platform 205.

It is noted that in example system 200, wireless network platform 205 includes, or is functionally connected to, a processor configured to confer at least in part the described functionality of the various components included in the wireless network platform 205. The processor (not shown) can execute code instructions (not shown) stored in memory 240, or a memory component thereon, to provide the described functionality. It should be appreciated that the processor can be a centralized element or be distributed among the various referenced components.

Figure 3:
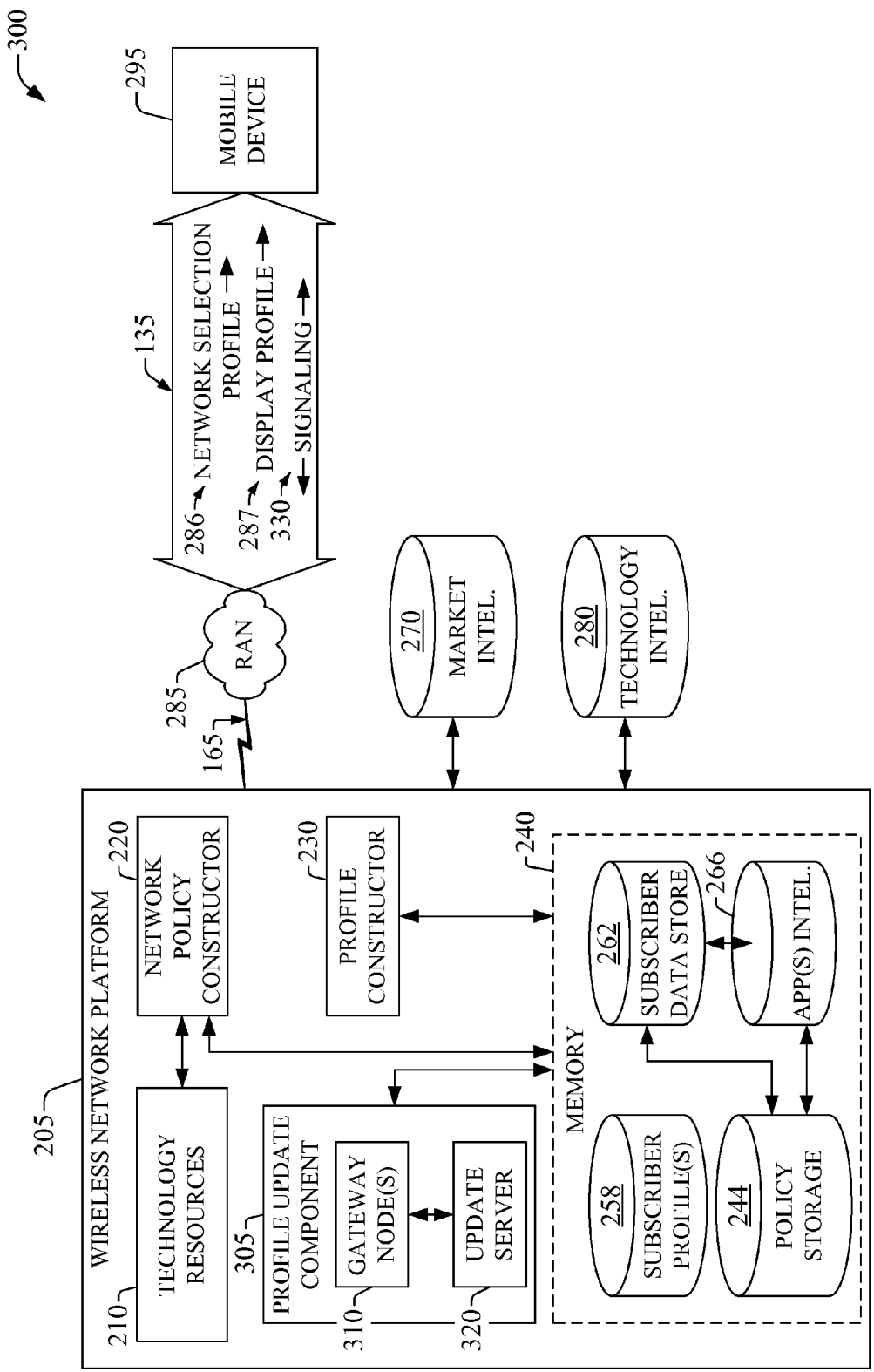
FIG. 3 is a block diagram of an example system that facilitate subscriber profile(s) update in accordance with aspects described herein.

FIG. 3 is a block diagram of an example system 300 that facilitate subscriber profile(s) update in accordance with aspects described herein. Network selection profile 286 and display profile 287 can be delivered to a subscriber station (e.g., mobile device 295) during provisioning of thereof, and as schedule-based or event-based changes occur. To facilitate delivery of a subscriber profile—network selection profile 286 and display profile 287—, profile update component 305 is functionally connected to memory element 258 or a storage platform that retains subscriber profile(s). Profile update component 305 includes gateway node(s) 310 and an update server 320, which can be an application server(s) such as a wireless application protocol (WAP) server, or a web server. Gateway node(s) 310 and update server 320 embody a dedicated data pipe to push subscriber profile updates OTA to subscriber(s). In addition, such connectivity can facilitate to receive trigger indication(s) (e.g., a short message service (SMS), a reserved bit in a frame of a control channel or in a packet header, a multi-bit word communicated in a control channel . . . ) from a mobile device 295 through signaling 330 to update a subscriber profile(s) upon mobility (e.g., inter-market roaming). It should be appreciated that signaling 330 can include signaling 288. In an aspect, updates to subscriber profile(s) 258 can be delivered either via (i) existing SMS mechanisms utilized for legacy roaming profiles or (ii) network-initiated PDP across profile update component 305, and the dedicated data pipe components comprised therein. In scenario (i), an SMS Wakeup/WAP Push message is conveyed to mobile device 295, upon such message is acknowledged via signaling 330, update server 320 pushes subscriber profile updates to mobile device 295. In scenario (ii), when an update trigger indication is received, gateway node(s) 310 authenticates the trigger indication and generates a PDP context with an access point name (APN) anchored in gateway node(s) 310 and associated with update server 320 as a packet data network. Once the update PDP context is active, profile update component 305 conveys an updated network selection profile 286 and display profile 287 to mobile device 295 through RAN 285 and associated wireless link 135.

Completed updates can be acknowledged (e.g., via ACK indication, one or more reserved bits in a packet header, a light-payload (e.g., 1-3 bytes) data packet, a predetermined multi-bit word conveyed in a radio frame within a control channel . . . ) through signaling 330 by a mobile station (e.g., mobile device 295) that receives the update, and the acknowledgement collected by profile updated component 305. In the absence of an ACK indication, profile update component 305 can employ various retry mechanisms until update confirmation is received, or the profile update component 305 logs a "failed update" flag in memory 240 after a predetermined number of retry attempts. Subscriber profile updates can be effected on-demand (whereby customer service intervention conveys an update trigger indication, for example); scheduled in accordance with predetermined times set by update server 320 or other network management component within wireless network platform 205; or event-based (upon arrival in a new market, for example). Illustrative example events that can trigger subscriber profile updates include, but are not limited to, changes in the following aspects: (i) market network capability or technology resources support; (ii) subscriber rate plan or usage profile; (iii) capacity migration and marketing plans; and (iv) subscriber relocation to a new market. To reduce loading and complexity of a wireless network platform 205, subscriber profiles and updates thereof can be delivered only for a served market: A change to a served market policy can be sent real-time or as per schedule, while non-served market policy updates can be sent upon market arrival only. At least two advantages of such update mechanism are to (1) eliminate unnecessary data traffic (for example, in case(s) a subscriber rarely visits a changed market) and (2) randomize, or uncorrelated, timing of updates so data traffic "spikes" are less likely to be generated by massive subscriber profile changes.

It is noted that in example system 300, wireless network platform 205 includes, or is functionally connected to, a processor configured to confer at least in part the described functionality of the various components included in the wireless network platform 205. The processor (not shown) can execute code instructions stored in memory 240, or a memory component thereon, to provide the described functionality. It should be appreciated that the processor can be a centralized element or be distributed among the various referenced components.

Figure 4A:
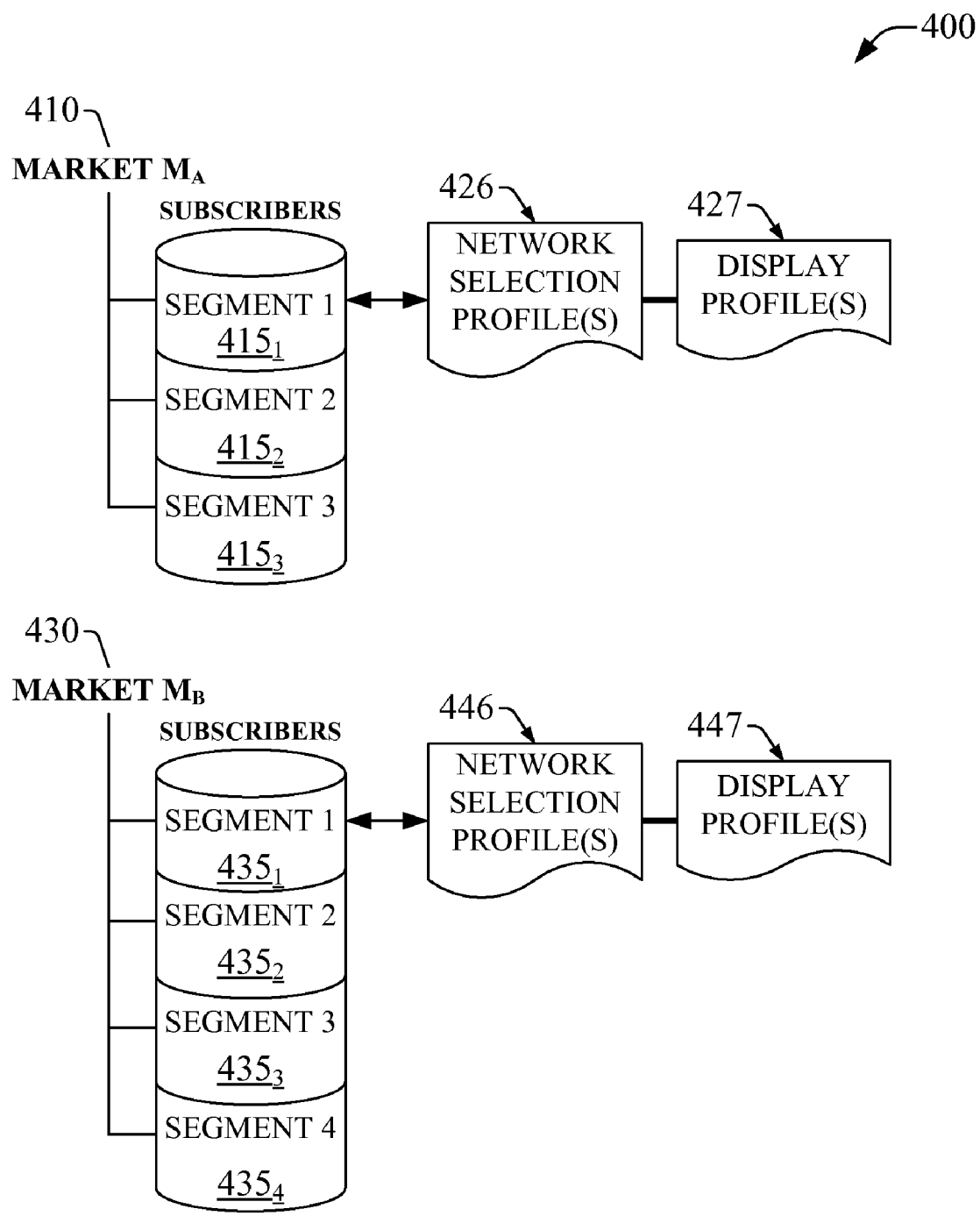
FIGS. 4A and 4B illustrate schematically subscriber segmentation for two disparate markets and network selection profile and display profile for a first type of subscriber type, respectively, in accordance with aspects of the subject innovation.
Figure 4B:
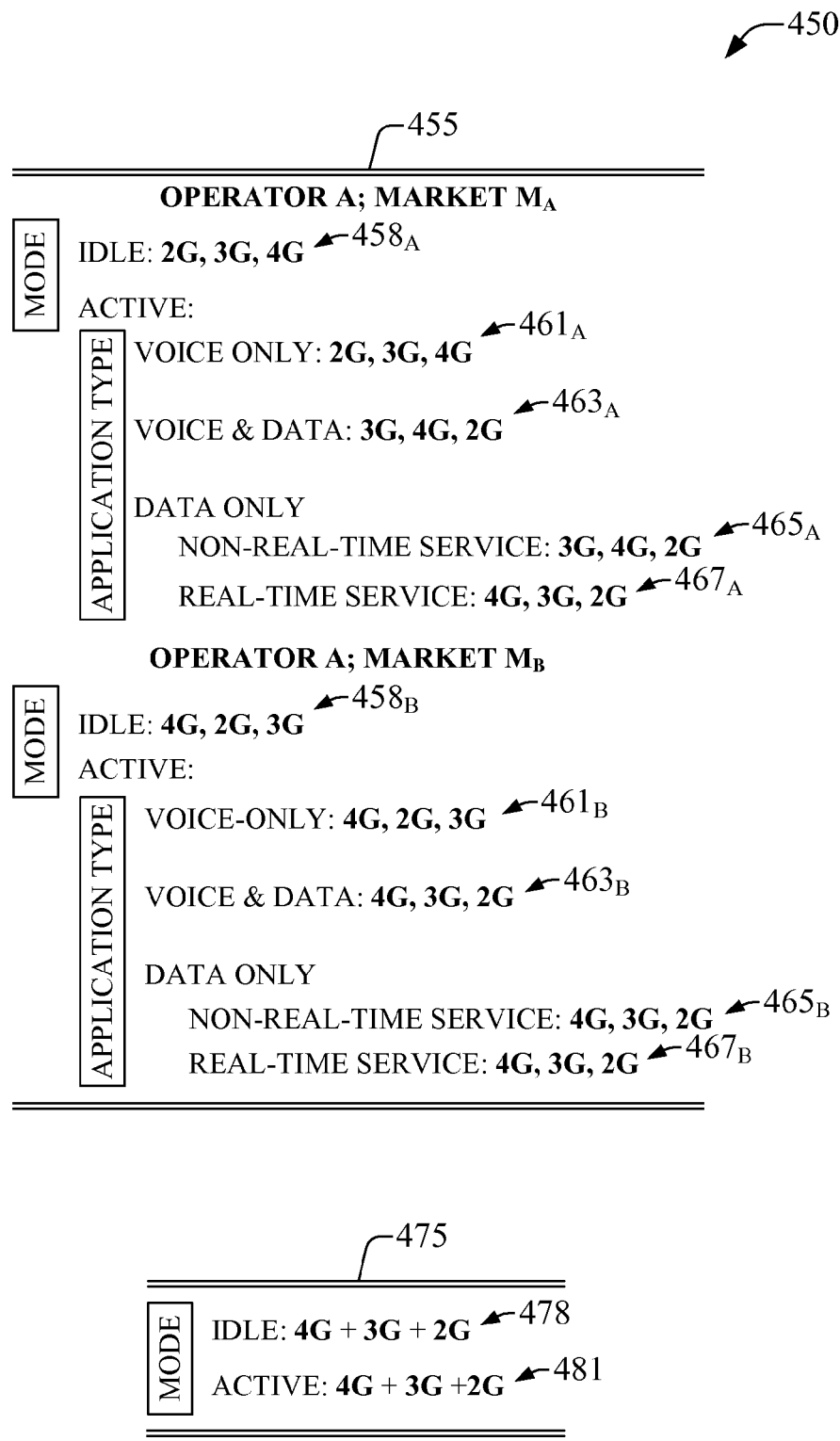

FIGS. 4A and 4B illustrate schematically example subscriber segmentation for two disparate markets and network selection profile and display profile for a first type of subscriber type, respectively, in accordance with aspects described herein. With respect to FIG. 4A, In diagram 400, a first market MA 410 serves a set of subscribers that can be grouped in three illustrative segments $415_1$-$415_3$ ordered in categories of decreasing commercial value to a service provider; segment 1 $415_1$ encompasses category A, or high-end subscribers that consume a substantive number of data services and provide substantial revenue. It should be appreciated that subscriber segmentation is facilitated by information retained in subscriber data store 262. In the subject illustrative scenario, market $M_A$ 410 possess an operational, yet immature, deployment of 4G network technology resources and is a home market for subscribers in segment 1 $415_1$. For subscriber on segment 1 4151, an associated network selection profile(s) 426 includes preference settings for radio technology utilization, and display profile(s) 427 conveys technology descriptors that dictate display behavior or subscriber stations for end users in segment 1 $415_1$.

Additionally, a second market $M_B$ 430 with mature deployed 4G technology resources encompasses four subscriber segments $435_1$-$435_4$. Segment 1 $435_1$ is a high-end category of subscribers. In an aspect, a source of a fourth subscriber segment in market $M_B$ 430 can be a section of a marketplace associated with retired individuals that contract wireless services other the conventional voice telephony like wireless broadband connectivity, such services can be employed for social networking. In an aspect, network selection profile(s) 446 can be an aggregate of network selection profile(s) 426 and radio technology preference settings adequate for efficient communication in market $M_B$ 430 and display profile(s). Display profile(s) 447 can be an aggregate of technological indicator(s) in display profiles(s) 427 or it can be a substantially unchanged profile of technological descriptor(s).

FIG. 4B is a depiction of an example network selection profile 455 for a subscriber within a high-end, top-category subscriber segment in accordance with aspects described herein. Network selection profile 455 is the result of aggregation of a network selection profile for first market $M_A$ 410 and second market $M_B$ 430. Each market entry in network selection profile 455 reveals a service operator indication ("Operator A") and a market code $M_v$ with v=A, B. For each market, a "Mode" tier includes a set of preference settings ordered in accordance with priority. In case of market $M_A$, telecommunication in idle mode $458_A$ is preferred to take place through 2G technology layer(s), e.g., a served mobile device is to camp in one or more 2G technology layers, unless such technology resources are unavailable, in which case 3G and 4G radio technology resources should be employed. In active mode, a set of radio technology preference settings is conveyed for "Application Type," wherein voice only communication $461_A$ is preferred to exploit 2G radio technology, followed by 3G and 4G; voice and data application(s) $463_A$ is to be effected through 3G, 4G, and 2G radio technologies; and radio technology preferences for data only application(s) can be further distinguished into non-real time service preferences $465_A$ which indicate to exploit 3G technology first and 4G and 2G subsequently, and real-time service preferences $467_A$ which convey to employ 4G technology resources, followed by 3G and 2G radio technologies. In addition, display profile 475 can be market agnostic, with technology descriptor(s) 478 and 481 for mobile device idle and active mode, respectively, indicating to display substantially all available technologies (e.g., 4G, 3G, and 2G) that wireless network platform can employ for wireless communication.

It is to be noted that network selection profile 455 and display profile 475 can be formatted in accordance with various schemas, such as hypertext markup language (HTML) and extensible markup language (XML) and variants (e.g., state chart XML (SCXML)), that are portable among computing platforms, wireless (e.g., a portable computer or mobile device) or otherwise, and object-oriented computing languages employed by a wireless device such as Delphi, Visual Basic, Python, Perl, Java, C++, and C#, and circuitry programming level languages such as Verilog.

Network selection profile(s) 286 and display profile(s) 287 are management instruments for mobile device operation that do not rely on substantive network signaling, and thus can reduce mean processor load and peak processor load within control-plane gateway and serving nodes, as well as control-plane server(s).

Figure 5:
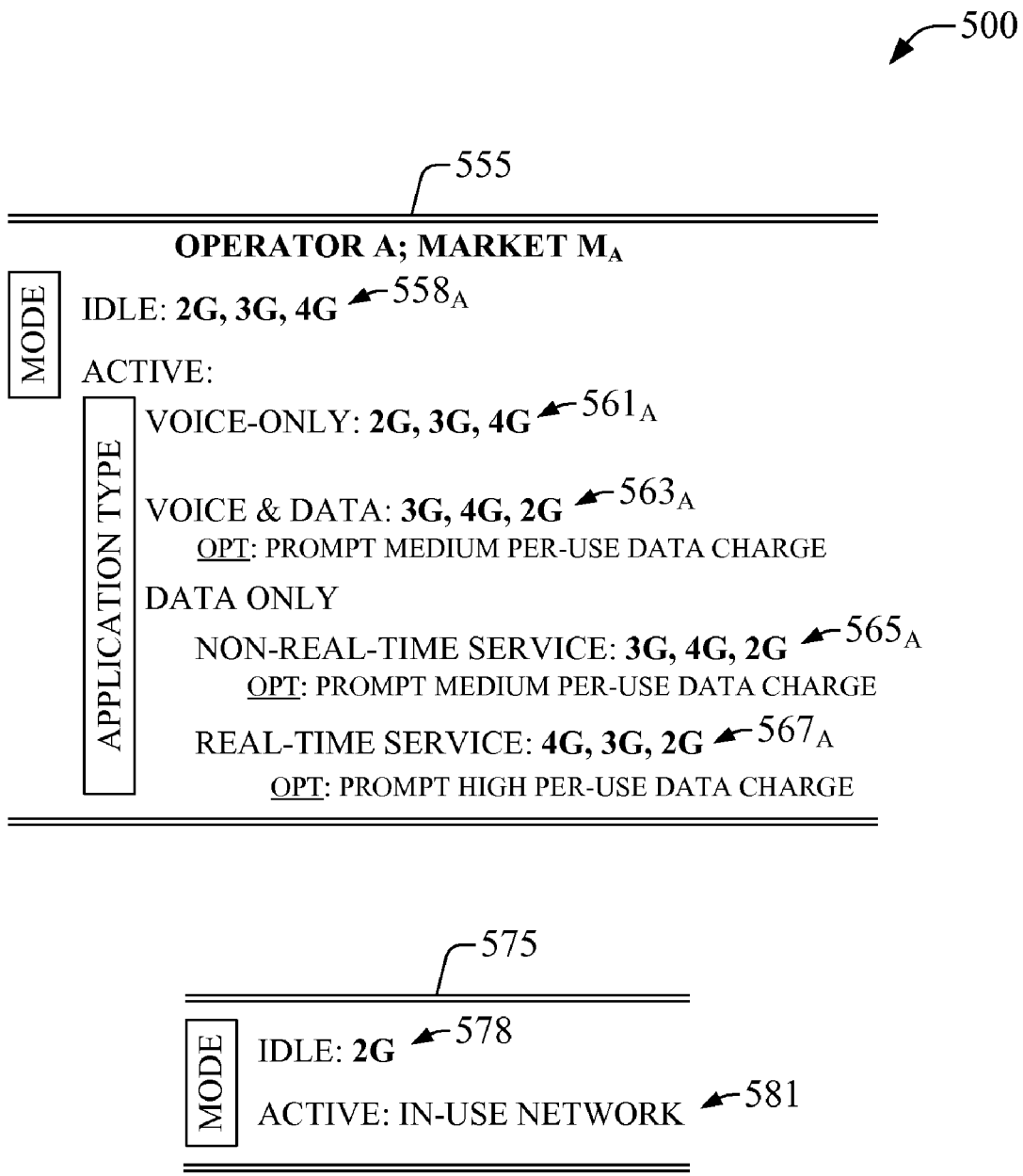
FIG. 5 illustrates schematically example network selection profile and display profile for a second type of subscriber type in accordance with aspects described herein.

FIG. 5 is a diagram 500 of an example network selection profile and display profile for a second type of subscriber in market $M_A$ 410, which possess an operational, yet immature, 4G radio technology network. As an example, the subscriber can be within low-end segment 3 $415_3$, a have a low level of service consumption and thus revenue generation for a service provider. In accordance with network selection profile 555, radio technology preferences for idle mode include 2G as a priority selection, followed by 3G and 4G. For active mode, voice only application(s), preference settings $561_A$ dictate to execute the application via 2G radio technology primarily, and 3G and 4G in case 2G bandwidth and capacity is heavily utilized at a time the voice application is launched. For voice and data application(s), selection preference $563_A$ sets forth 3G radio technology as a priority resource, and 4G and 2G as subsequent choices; it is to be noted that 2G technology resource(s) is assigned the least priority since the application involves data traffic in addition to voice. It is to be noted that since the subscriber is in a low-end segment, network selection profile includes a modifier (OPT) that prompts the subscriber to accept medium per-use (e.g., a session, or a predetermined time interval) data charges for utilization of 3G radio technology resources. In case of data-only application(s), for non-real time data service(s), network selection profile 555 indicates 3G as a first choice, and 4G and 2G as second and third choices. A modifier entry in the profile is also included in the network selection profile to facilitate to prompt the subscriber to accept medium per-use data charges. For real-time data service(s), preference settings $567_A$ prioritize 4G radio technology, with 3G and 2G radio resources completing the three-tier preference. A modifier entry in the profile prompts the subscriber to accept high per-use data charges to benefit from available 4G technology layers that serve market $M_A$ 410.

With respect to display profile 575, for the low-end subscriber in segment 3 $415_3$ of market $M_A$ 410, in idle mode a mobile station is to display an indicator for 2G radio technology resources, while for active mode of operation, an in-use network is to be displayed. In addition to the 2G technology indicator, in view of the modifier entries (OPT), a served wireless device displays prompt(s) for premium services within a network display indicator. Accordingly, a subscriber within segment $415_3$ is made aware explicitly of a lack of subscribed, or contracted, premium data services.

It is to be noted that selection of idle mode radio technology preferences can be dictated by battery draw characteristics of a mobile device for disparate radio technologies within radio resources 210 available to a wireless network platform 205. Regardless of such selection, ad discussed above, radio technology is adapted to a radio technology compatible with preferences established within a network selection profile 286 for active mode when a call (e.g., voice call or data session, or both) start. Typically, such characteristics are substantially noticeable among disparate radio technologies. Idle mode radio technology selection preferences can be prioritized to promote idle-mode camping on a most battery-efficient radio technology. For example, in a market $M_v$, for a subscriber segment comprised primarily of early adopters, 2G (e.g., GSM) technology can be the only radio technology preferred for idle mode operation for a new type of mobile device known to exhibit substantive battery draw in other radio technologies. Generally, irrespective of market or subscriber segment, idle mode battery issues known for specific mobile devices can be addressed at least in part within the subject innovation, through proper selection of idle mode radio preferences. It should be appreciated, however, that one or more type of wireless devices can be most insensitive to idle mode battery drain characteristics, in which case(s) idle mode radio technology preferences do not depend upon battery-efficiency considerations.

It is to be further noted that in the example network selection profile for low-end subscriber, network selection is substantially the same as high-end. A reason for such profile aspect is to exploit or chose a most efficient network in order to minimize operational cost(s) and service(s) price points for high-end and low-end subscribers. The operational difference in the subscriber plane is in end-user interface and feedback.

Figure 6:
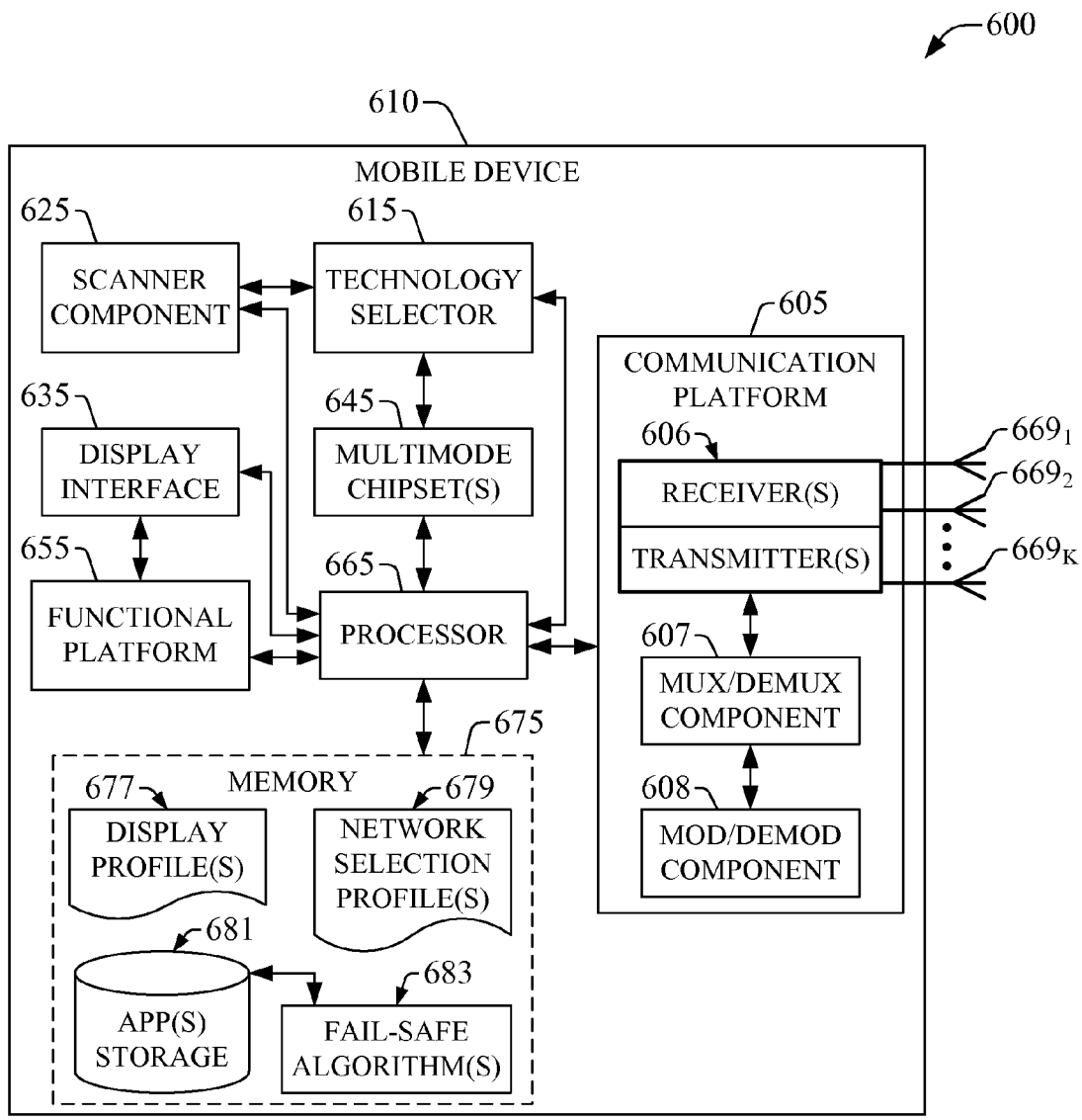
FIG. 6 is a block diagram of a mobile device that can exploit multiple radio technologies based at least in part on a network selection profile, and render technological indicator(s) as dictated through a display profile in accordance with aspects of the subject innovation.

FIG. 6 is a block diagram of an embodiment 600 of a mobile device that can exploit multiple radio technologies based at least in part on a network selection profile, and display technological indicator(s) as dictated at least in part through a display profile in accordance with aspects of the subject innovation. In an aspect, mobile device 610 embodies mobile device 295. In mobile device 610, which can operate in multi-technology multimode, a set of antennas $669_1$-$669_K$ (K is a positive integer) can receive and transmit signal(s) from and to wireless devices like base stations, access terminals, wireless ports and routers, and so forth, that operate in a radio access network, e.g., RAN 285. It should be appreciated that antennas $669_1$-$669_K$ are a part of communication platform 605, which comprises electronic components and associated circuitry that provide for processing and manipulation of received signal(s) and signal(s) to be transmitted. In an aspect of the subject innovation, communication platform 605 can receive a network selection profile(s) 679 and a display profile(s) 677, which are part of a subscriber profile, and retain, through processor 665, the network selection profile(s) 679 and display profile(s) 677 in memory 675. In addition, communication platform 605 can acknowledge a received subscriber profile and can convey an indication to update the received subscriber profile in accordance with aspects described hereinbefore in connection with mobile device operation in example systems 200 and 300.

In an aspect, communication platform 605 includes receiver(s)/transmitter(s) 606 that can convert signal from analog to digital upon reception, and from digital to analog upon transmission. In addition, receiver/transmitter 606 can divide a single data stream into multiple, parallel data streams, or perform the reciprocal operation; such operations typically conducted in various multiplexing schemes. Functionally coupled to receiver(s)/transmitter(s) 606 is a multiplexer/demultiplexer (mux/demux) component 607 that facilitates manipulation of signal in time and frequency space. Electronic mux/demux component 607 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 667 can scramble and spread information (e.g., codes) according to substantially any code; e.g., Hadamard-Walsh codes, Baker codes, Kasami codes, polyphase codes, and so on. A modulator/demodulator (mod/demod) component 668 is also a part of communication platform 605, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 600, mod/demod component 608 is functionally coupled to mux/demux component 667. In embodiment 600, processor 635 facilitates, at least in part, mobile 610 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

In embodiment 600, multimode chipset(s) 645 allows mobile 610 to operate in multiple communication modes through various radio network technologies (e.g., 2G, 3G, 4G . . . ) in accordance with disparate technical specifications, or standard protocols, for the radio network technologies. In particular, multimode operation chipset(s) 615 utilizes communication platform 605 in accordance with the standard protocols specific to a mode of operation. In another aspect, multimode operation chipset(s) 615 can be scheduled to operate concurrently (e.g., when K>1) in various modes or within a multitask paradigm. A technology selector 615 can operate, or drive operation of, multimode chipset(s) 645 through selection and realization of one or more radio network technologies for communication in a specific telecommunication mode. In an aspect of the subject innovation, as described above, selection of a technology resource is dictated at least in part via network selection profile(s) 679, which can be retrieved from memory 675 by technology selector 615 in order to implement network selection preferences. It is to be noted that technology selector 615 can exploit fail-safe algorithm(s) 683 when memory 675 fails to retain display profile(s) 677 and network selection profile(s) 679.

It is to be noted that technology selector 615 dictates, at least in part, the behavior of mobile device 610 in active mode without substantive reliance on wireless platform network signaling. To adopt a radio technology in accordance with a network preference setting, radio technology availability is to be ascertained, which can be effected in idle mode. In an aspect of the subject innovation, scanner component 625 determines available radio technologies in at least three modes: (a) Passive, (b) active, and (c) hybrid. In (a), scanner component 625 can periodically scan all capable technologies and EM radiation bands (e.g., RF bands, microwave bands . . . ) in order to ascertain radio technology availability within a wireless environment; the period of each scan can be determined in operation algorithm(s) (not shown) retained in memory 675. A scan includes detection of pilot signal(s) received from a wireless network platform through a radio access network (e.g., RAN 235). Pilot signal strength measured per band or per channel can be contrasted with minimum radio link quality, or signal strength, criteria received through broadcast system-information messages for idle mode camping or cell synchronization. It should be appreciated that, in an aspect, signal strength and channel quality can be determined through measurements over a set of time-frequency resources of signal-to-noise ratio(s) (SNRs), signal-to-interference ratio(s) (SINRs) or signal-to-noise-and-interference ratio. Mobile device 610, through scanner component 625 can determine whether a radio technology is available in accordance with the foregoing criteria as described in standard protocol(s) for a radio technology layer(s). In particular, for a radio technology, most any measured pilot signal with adequate signal strength and quality that meets broadcast system information messages is to be deemed available. In (b), radio scannings are mitigated. As opposed to active mode (e.g., blind scanning, and decoding, of all radio resources of a serving network), in passive mode scanner component 625 can exploit system information broadcast messages conveyed by a radio technology that serves mobile device 610 to drive or streamline radio scanning(s) to establish radio technology availability. As an example, a 2G radio technology (e.g., GSM) can convey in a broadcast channel, for a specific coverage area (e.g., a sector or cell), information related to neighbor cells that operate in disparate technologies like 3G (e.g., 3GPP UMTS) or 4G (e.g., LTE Advanced). Thus, scanner component 625 ascertains available radio technologies in the wireless environment of the coverage area without execution of a radio scanning. Hybrid mode (c) exploits system information received in broadcast messages to drive, or streamline, a radio scanning to ascertain radio technology availability. It should be appreciated that hybrid mode of operation can be effected when broadcasted system information fails to unambiguously deliver information that reveal one or more available radio technologies in a wireless environment. At least one advantage of passive and hybrid modes is mitigation of mobile device battery drain and ensuing extension of battery life, particularly when supported by system information broadcast messages from legacy technologies. Scanner component 625 can retain availability indicators (not shown) in memory 675. Scanner component 625 can convey available technology layer(s) to technology selector 615 in order to implement network selection preferences as provided in network selection profile(s) 679. Additionally, scanner component 625 can convey via processor 665 available radio technologies to display interface 635.

Mobile device 610 also includes a functional platform 655 that comprises a set of components (not shown) that provide, at least in part, one or more specific functionalities that complement or supplement wireless communication. As an example, in a case mobile device 610 is a telephone, functional component includes functional elements such as a data entry interface (e.g., a keyboard, a biometric pad for biometric-based access, a microphone, a loud speaker . . . ), a camera, peripheral connectors (e.g., a USB port for transferring data to a disparate device), a voice coder-decoder (vocoder), and so on. It should be appreciated that functional platform 655 can exploit applications stored in application(s) storage 681 within memory 675 to provide one or more functionalities. In an aspect of the subject innovation, technology selector 615 can exploit one or more drivers in application(s) storage 681 to interface with functional platform 655, via processor 665, to properly realize and execute radio technology and application(s) combinations in mobile device 610.

As indicated above, functionality of mobile device can rely at least in part on execution of a set of one or more applications retained in application(s) storage 681; processor 665 can be configured to initiate, launch, or terminate execution of the set of applications. In an aspect of the subject innovation, mobile device 610 can exploit application combinations within a single radio technology in accordance at least in part to network selection profile(s) 679. When mobile device 610, via processor 665, launches multiple simultaneous applications that have disparate network selection priorities, mobile device 610 selects a single radio technology that suits all launched application and represents substantially the substantially best performance compromise. For example, a combination of a voice-only application with radio technology preference setting {2G, 3G, 4G} with a real-time data-only call with {4G, 3G, 2G} preference settings can be best served on 3G technology resources, which can support both application types.

In an aspect of the subject innovation, technology selector 615 can implement cost-utility analysis to determine which radio technology, or technology layer(s), provides a substantially best performance. To that end, technology selector 615 can exploit artificial intelligence (AI) methods to infer (e.g., reason and draw a conclusion based upon a set of metrics, arguments, or known outcomes in controlled scenarios) suitable technology layer(s) that provide efficient service of applications with disparate network selection preferences. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation.

In particular, to select a radio technology with a favorable cost-utility metric, technology selector 615 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

In another aspect related to application(s) utilization, upon initiation or launch of application(s), mobile device 610 can change radio technology in accordance to application type preferences, or requirements, established in network selection profile(s) 679. As an example, in illustrative network selection profiles 455 and 555, radio technologies {4G, 3G, 2G} have been set forth for data-only real-time, or streaming, services. Accordingly, in an aspect, mobile device can autonomously leave 2G idle mode, for example, and initiate a data session on 4G technology unless unavailable, in which case 3G technology takes precedence over 2G technology. The device will therefore not require nor follow a technology-specific directed retry or redirect message from the idle mode network to the target network.

In accordance to idle mode behavior requirements for network selection, mobile device 610, e.g., through scanner component 625, is to be aware of available technologies at most all or all times. In a scenario in which a requested application type can operate with a single predetermined radio technology, and such required technology is unavailable, mobile device 610 can block application(s) access attempts and provide subscriber notification. At least another advantage of management of application launch as described herein is that mobile device 610 can administer launch of an application without reliance on signaling from a serving wireless network platform, which reduces the wireless network platform operational burden. As a non-limiting illustration, a voice and data network selection preference setting may include 3G technology only; thus, mobile device 610 can block execution of such applications at the device level when 3G radio technology is not available.

In a further aspect related to application execution, when an application is released, mobile device 610 can autonomously return to operation in idle mode in the highest priority radio technology that is available; the highest priority dictated by network selection profile(s) 679. At least an advantage of such release mechanism is that mobile 610 device neither requires nor follows a radio technology-specific channel release from a serving wireless network platform; thus, signaling there from and load thereof are reduced. When the idle mode radio technology is same as a radio technology prior the application launch, and mobile device 610 remains to operate within an original location like a cell, or sector within a cell, and thus has the same LAC and RAC, the mobile device 610 will not initiate location area update (LAU) or routing area update (RAU) procedure(s). Conversely, when mobile device 610 relocates to a different sector, cell, or market, mobile device 610 can initiate LAU or RAU to ensure proper delivery and paging of incoming calls.

Display interface 635, which also can reside within functional platform 655, facilitates gestures for subscriber-device interaction via at least one of a screen (e.g., a liquid crystal display (LCD), a plasma panel, a monolithic thin-film based electrochromic display . . . ), a sound interface, and so forth. Additionally, display interface 635 can render content(s) that (i) control functionality of mobile device 610 as available in functional platform 655, or (ii) reveal operation conditions thereof. With respect to the latter, in an aspect, display interface 635 can convey technology indicator(s), or descriptor(s), in accordance at least in part with display profile(s) 677, as described herein. Display interface 635 can indicate available technology as opposed to display only in-use radio technology as performed in conventional mobile devices. When display profile(s) 677 allows, all available technologies can be displayed on the device, otherwise a profile-specified subset can be displayed. It should be appreciated that display interface 635 exploits information on radio resource(s) availability that is extracted from one or more of scanner component 625 modes of operation; namely, active, passive, or hybrid.

To facilitate operation of mobile device 610 in a multi-technology environment in accordance with aspects described herein, as indicated supra, memory 675 can retain subscriber-specific network selection profile(s) 679 and display profile(s) 677. In an aspect, memory 675 is at least in part a subscriber-specific removable computer-readable storage medium such as for example a SIM, which can be relocated between mobile devices in order to port display and network selection preferences. Memory 675 also retains fail-safe algorithm(s) 683 that facilitate operation of mobile device 610 when radio technologies deemed preferred are not available, or technology selector 615 is faulty or unavailable in a mobile device. As an example, when memory 675 is at least in part a removable computer-readable medium and it is replaced in a mobile device that fails to support multi-technology operation via network selection profile(s) 679, a processor that provides at least a portion of functionality of the mobile device can execute the fallback fail-safe algorithm(s) 683 to operate the mobile device in a default mode. In another aspect, fail-safe algorithm(s) 683 also facilitates operation and wireless communication of mobile device 610 via legacy radio technology layer(s).

Additionally, memory 675 can store data structures (e.g., metadata); code structure(s) (e.g., modules, objects, classes, procedures) or instructions, or substantially any type of software or firmware that processor 665 can execute to provide functionality associated with substantially any component, platform, interface, selector and so forth, within mobile 610, in accordance with aspects of the subject innovation. Moreover, memory 655 can also retain (not shown) network or device information like specifications, address book(s); code sequences for scrambling, spreading, blind decoding hypothesis, semi-persistent scheduling parameters, pilot signal(s) (e.g., reference signal(s)); frequency offsets, cell IDs, and so on. Furthermore, memory 675 also can retain content(s) (e.g., multimedia files, subscriber-generated data); security credentials (e.g., passwords, encryption keys, digital certificates, biometric reference indicators like voice recordings, iris patterns, fingerprints); hardware indentifying tokens such as IMSI, a serial product number such as MEID and the Telecommunications Industry Association (TIA) electronic serial number (ESN); and so forth.

Mobile 610 also includes a processor 665 configured to confer functionality, at least in part, to substantially any component, platform, interface, selector and so forth, within mobile 610, in accordance with aspects of the subject innovation. In embodiment 600, processor 635 is illustrated as external to the various functional elements (e.g., components, interfaces, platforms, selectors . . . ) of mobile 610; however, processor 635 can be distributed across such various functional elements. In addition, processor 635 is functionally coupled (e.g., through a memory bus) to memory 655 in order to store and retrieve information such as code instructions, data structures, etc., necessary to operate and/or confer functionality, at least in part, to communication platform 605, technology selector 615, multimode chipset(s) 645, scanner component 625, display interface 635, functional platform 655 and component therein, and other operational components (not shown) of multimode mobile 610.

Figure 7A:
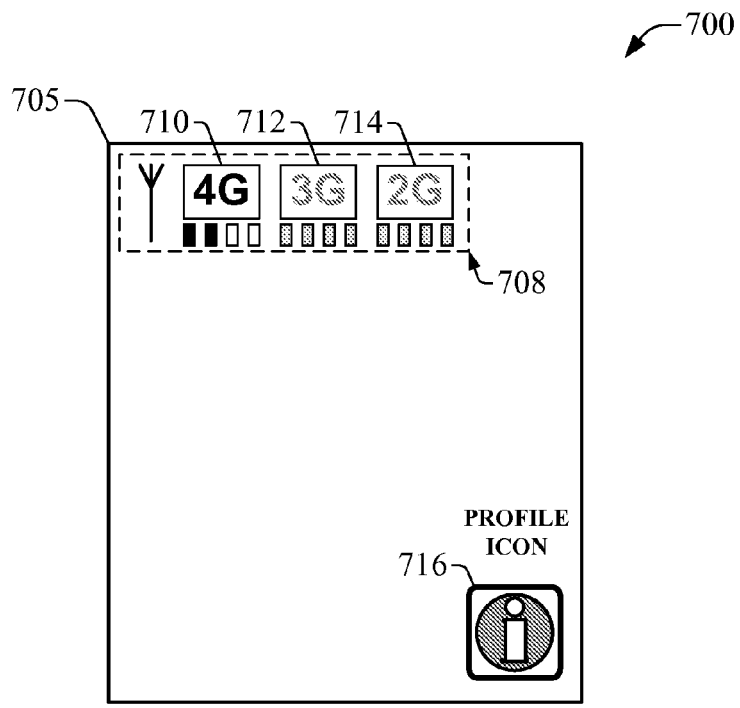
FIGS. 7A and 7B illustrate example displays instances of a mobile device in accordance with a received display profile and user-device interaction as described in the subject innovation.
Figure 7B:
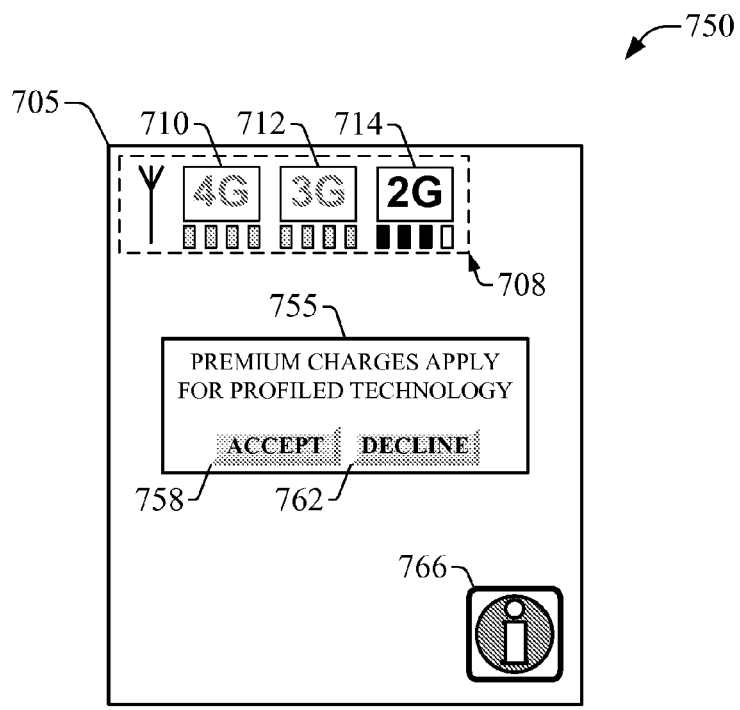

FIGS. 7A and 7B illustrate example display instances of a mobile device in accordance with a received display profile (e.g., display profile 475) and end-user-device interaction. In FIG. 7A, diagram 700 presents a display 705 that renders a set of available radio technologies in a technology descriptor panel 708. The technologies rendered are dictated by a display profile (e.g., display profile 475). In an aspect, an active technology engaged in communication, e.g., 4G 710 is highlighted, whereas remaining available technologies, e.g., 3G 712 and 2G 714 are displayed less prominently. Display 705 also renders a signal strength indicator (e.g., a set of bars with solid bars conveying a metric of radio link quality) for each available technology, with active indicator for the radio technology for communication. In display 705, a profile icon 716 can be facilitate access to a network selection profile (e.g., network selection profile 450) and a display profile (e.g., display profile 475) retained in the mobile device. In addition, icon profile 716 can provide access to service provider customer service to convey requests for update profile; interaction among an end user and customer representative can exploit voice or text-based messaging systems like a chat session.

With respect to FIG. 7B, diagram 750 illustrates a pop-up window 755 that prompts a subscriber to accept 758 or decline 762 premium charges, the charges are incurred for utilization of a profiled technology in accordance with a network selection profile. Other information can be presented in pop-up window 755, such as actual charges for profiled technology usage. In an aspect, upon acceptance, pop-up window 755 can display charges for various session types (e.g., single-call rate, hourly rate, daily rate . . . ), and technology descriptor panel 708 switches to highlight the profiled technology. Alternatively, or in addition, icon 766 can provide access to rate schedules for premium charges, or access to customer service in connection with radio technology usage; icon 766 also includes substantially all functionality of profile icon 716. It should be appreciated that other gestures for user-device interaction like email alert, instant message alert, aural alert, etc., can be employed to prompt a subscriber to determine whether to accept or reject premium charges and exploit the ensuing profiled radio technology (e.g., 4G technology).

In view of the example systems described above, example methodologies that can be implemented in accordance with the disclosed subject matter can be better appreciated with reference to flowcharts in FIGS. 8-13. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be further appreciated that the methodologies disclosed throughout the subject specification are capable of being stored on an article of manufacture to facilitate transporting and transferring such methodologies to computers for execution by a processor or for storage in a memory.

Figure 8:
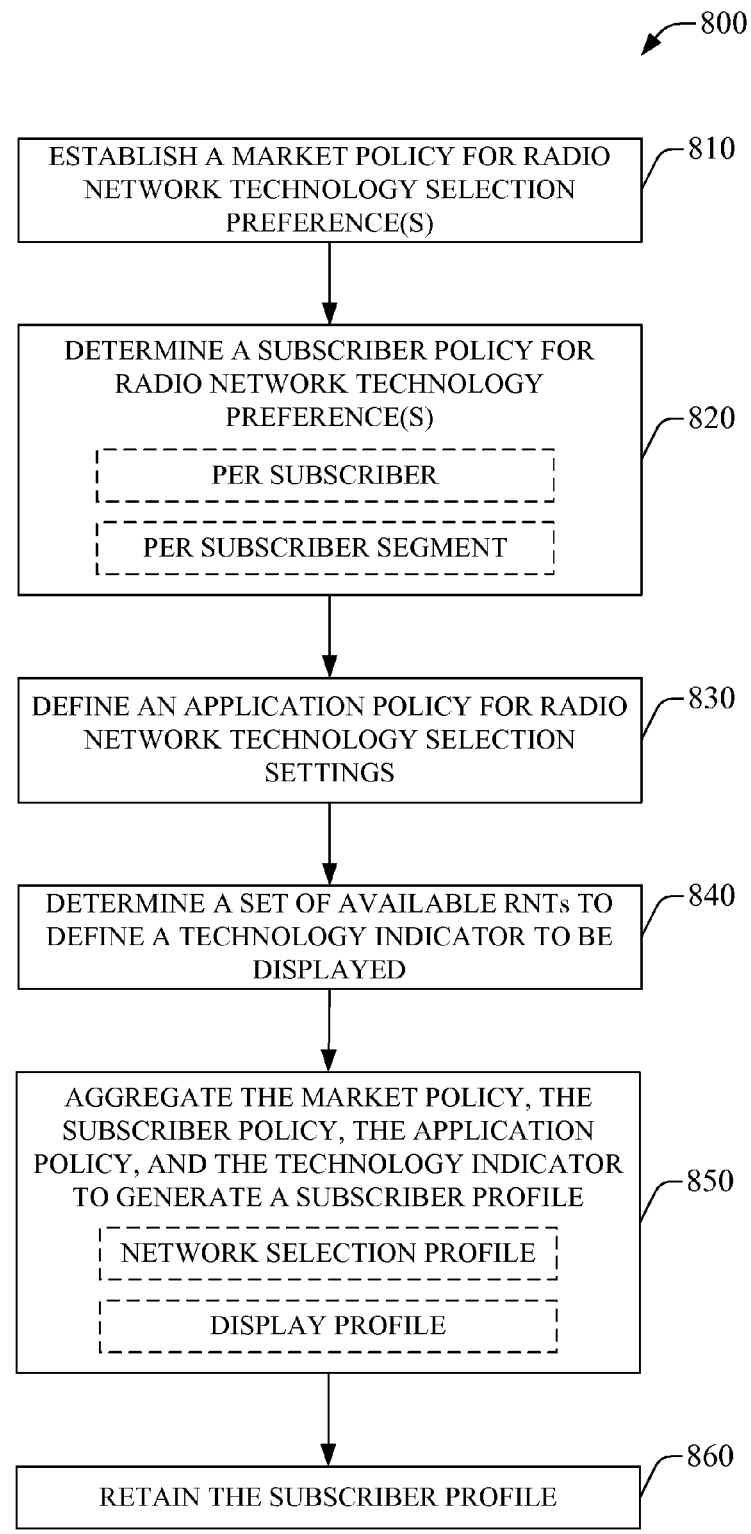
FIG. 8 presents a flowchart of an example method for establishing a subscriber profile according to aspects of the subject innovation.

FIG. 8 presents a flowchart of an example method 800 for establishing a subscriber profile according to aspects of the subject innovation. In an aspect, the subject example method can be enacted via a wireless network platform. At 810, a market policy for radio network technology, or radio technology, selection preference(s) is established. At act 820, a subscriber policy for radio network technology preference(s) is determined. Subscriber policy can be determined per subscriber, identified via an MDN, IMSI, MELID, ENS, or other codes or tokens. At act 830, an application policy for radio network technology selection settings is defined. Policy can discriminate preference settings according to application type, e.g., voice application, data application, or voice and data application. At act 840, a set of available radio network technologies is determined in order to define a technology indicator to be displayed in a multi-technology wireless device. A determination can be based on available radio technology intelligence associated with a wireless network platform. The technology intelligence can include information on at least one of deployed technology layers that facilitate telecommunication in accordance with standardized protocol for the technology, evolution stages of radio technologies deployed and pursued by the wireless network platform, and so on. The network technology indicator, or descriptor, can be defined for either idle or active mode of operation, or both, of the multi-technology wireless device. At act 850, the market policy, the subscriber policy, the application policy, and the technology indicator, or descriptor, are aggregated to generate a subscriber profile. In an aspect, the subscriber profile can be grouped into a network selection profile and a display profile (see, e.g., FIGS. 4A-4B and FIGS. 5A-5B). At act 860, the subscriber profile is retained.

Figure 9:
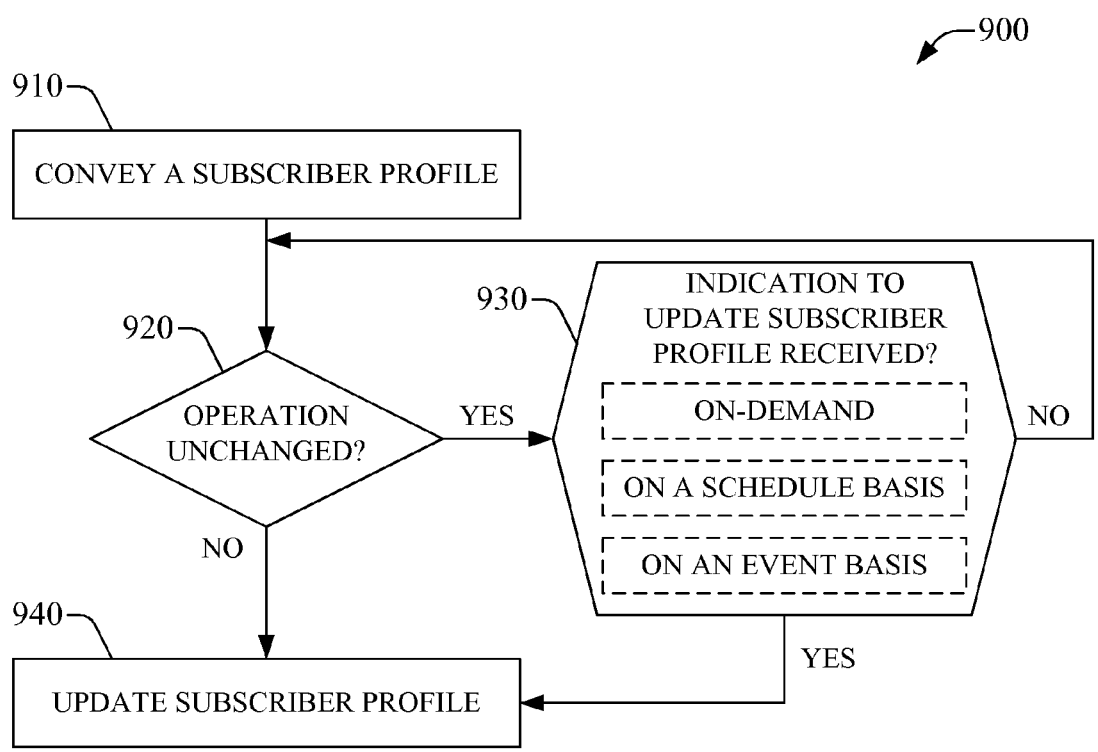
FIG. 9 is a flowchart of an example method for updating a subscriber profile according to aspects described herein.

FIG. 9 is a flowchart of an example method 900 for updating a subscriber profile. At act 910, a subscriber profile is conveyed. It should be appreciated that a mobile device can enact the subject example method. In an aspect, network selection preferences and display setting for technology descriptors can be delivered at a time of provisioning a mobile device. At act 920, it is probed whether operation of a mobile device remains unchanged. In the negative case, a subscriber profile is updated. As an example, a subscriber profile can be updated when a mobile device moves away from a home market, or when a subscriber is relocated within a subscriber segmentation. Changes in subscriber segmentation can be the result of, for example, a subscriber acquiring premium data services. In the positive case, when device operation remains unchanged, it is checked whether an indication to update a subscriber profile is received 930. Update triggers, or the indication to update a subscriber profile, can be based at least in part on demand, e.g., a subscriber or customer service requesting an update; on a schedule basis, wherein at predetermined times a subscriber update is delivered; or on an event basis, like when one or more technology layer(s) are added to a wireless network platform, a new market is visited, or the like. When a finding of act 930 is that an update trigger is received, a subscriber profile is updated at act 940. In an aspect, subscriber profile update includes probing for receiving an update confirmation, or acknowledgement, from a mobile device operated for the subscriber whose profile is being updated. When an acknowledgement is received, a subscriber update procedure is terminated as successful. Conversely, when no acknowledgement is received, a finite number of successive retry are pursued until either acknowledgement is received, or a maximum number (e.g., 5-10) of retries is attained. In the latter case, the updated is flagged or logged as unsuccessful.

Figure 10:
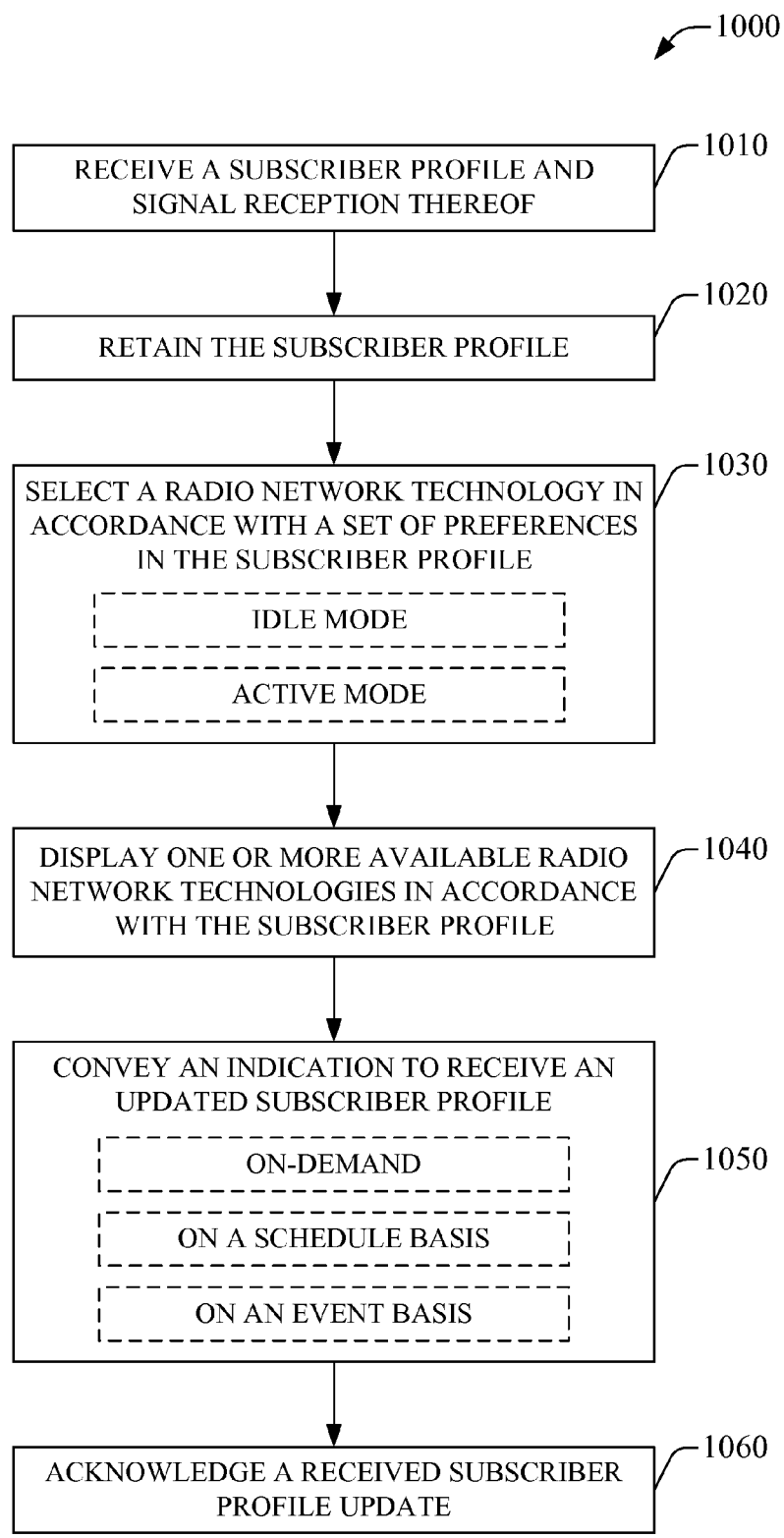
FIG. 10 is a flowchart of an example method for selecting a radio technology to operate a multi-technology wireless device in a multi-technology environment according to aspects described herein.

FIG. 10 is a flowchart of an example method 1000 for selecting a radio technology to operate a multi-technology wireless device in a multi-technology environment according to aspects described herein. At act 1010, a subscriber profile is received and reception thereof is signaled. A subscriber profile comprises two elements: a network selection profile, and a display profile. In an aspect, the network selection profile includes preference setting for selecting a radio technology in idle mode or active mode of operation of a multi-technology device that receives the subscriber profile. Network selection profile and display profile can be formatter according to various portable and extensible schema such as HTML, XML, or variations thereof. At act 1020, the received subscriber profile is retained. In an aspect, subscriber profile can be stored within a removable memory element within the device, such as a SIM card. At act 1030, a radio network technology is selected according with a set of preferences in the subscriber profile. In an aspect, radio technologies are prioritized differently for idle mode operation than for active mode operation. It should be appreciated that the selection is dynamic: each call or data session that is active and served through a multi-technology device that exploits the subscriber profile results in a specific radio network technology selection. At act 1040, one or more available radio network technologies are displayed in accordance with the received display profile included within the received subscriber profile. In an aspect, available radio technologies can be determined by scanning a wireless environment for pilot signal(s) compatible with various radio technologies and determining whether signal strength and channel quality meet predetermined criteria imposed by radio technology standard protocols. In addition, or alternatively, radio technology availability can be ascertained through information related to a wireless coverage area, the information carried in system information broadcast messages delivered by one or more technology resources in a serving wireless platform. At act 1050, an indication to receive an updated subscriber profile is conveyed. An indication can be at least one of a SMS message, a reserved bit within a management, or control, frame or protocol data unit header, a multi-bit word conveyed in an uplink control channel, or the like. In addition, an update indication or trigger can conveyed on demand, on a scheduled basis, or on an event basis. At act 1060, a received subscriber profile update is acknowledged (e.g., via ACK indication, one or more reserved bits in a packet header, a light-payload data packet, a predetermined multi-bit word conveyed in a radio frame . . . ).

Figure 11:
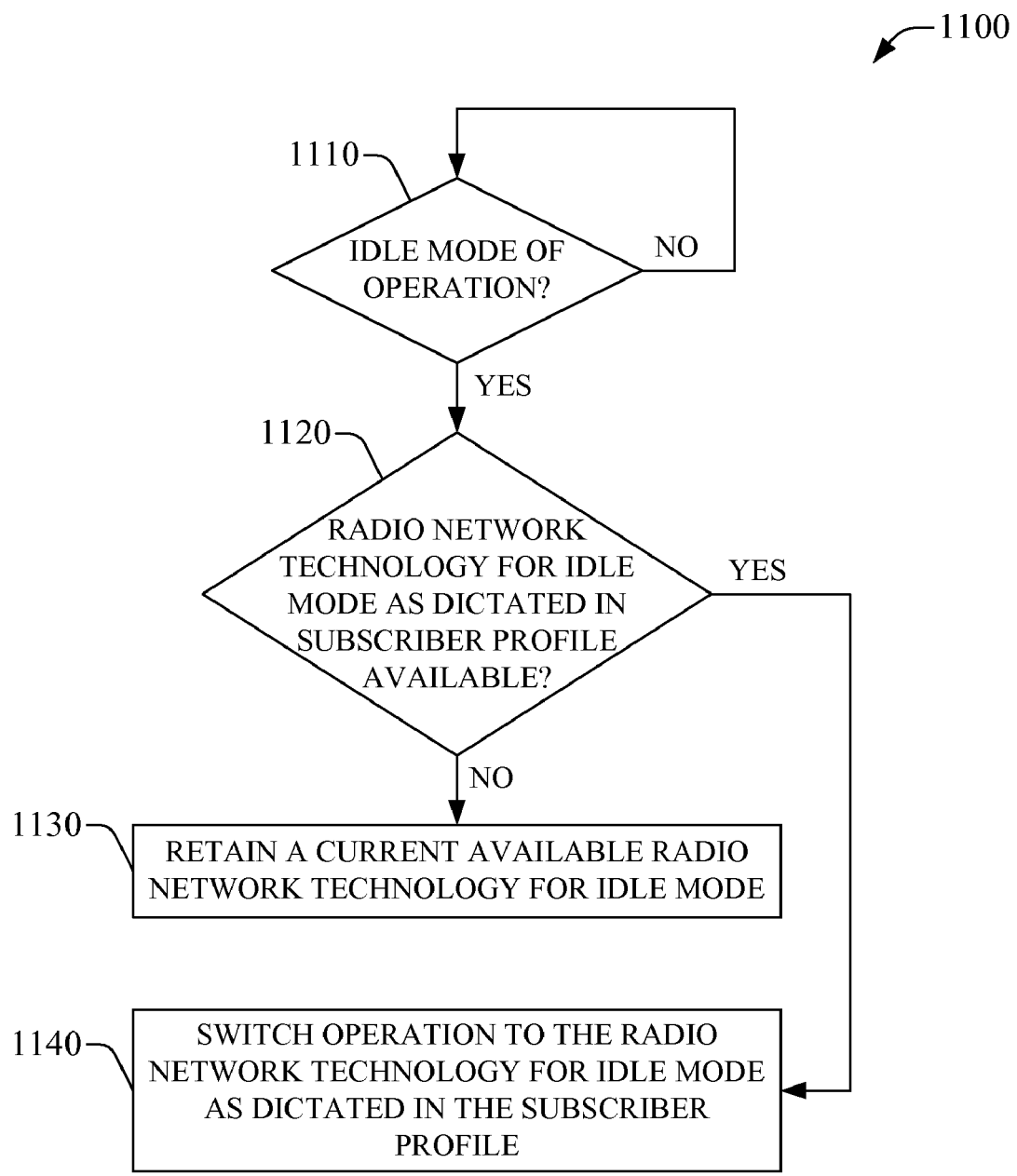
FIG. 11 is a flowchart of an example method for selecting a radio technology for idle mode operation according to aspects described herein.

FIG. 11 is a flowchart of an example method 1100 for selecting a radio technology for idle mode operation according to aspects of the subject innovation. A mobile device can enact the subject example method. In addition, the subject example method can be exploited in conjunction with example method 1100. At act 1110, it is evaluated whether an idle mode of operation is taking place. In the negative case, the probe is re-enacted. Conversely, at act 1120 it is probed whether a radio network technology for idle mode as dictated in a subscriber profile is available. In an aspect, availability can be ascertained by scanning a wireless environment for specific broadcast messages, e.g., pilot signals, that meet a specific set of criteria for signal strength and channel quality. When the radio network technology is available, flow is redirected to act 1140, in which operation is switched to the radio technology network for idle mode as dictated in the subscriber profile. Conversely, when the radio technology is unavailable, a current available radio network technology is retained for idle mode at act 1130.

Figure 12:
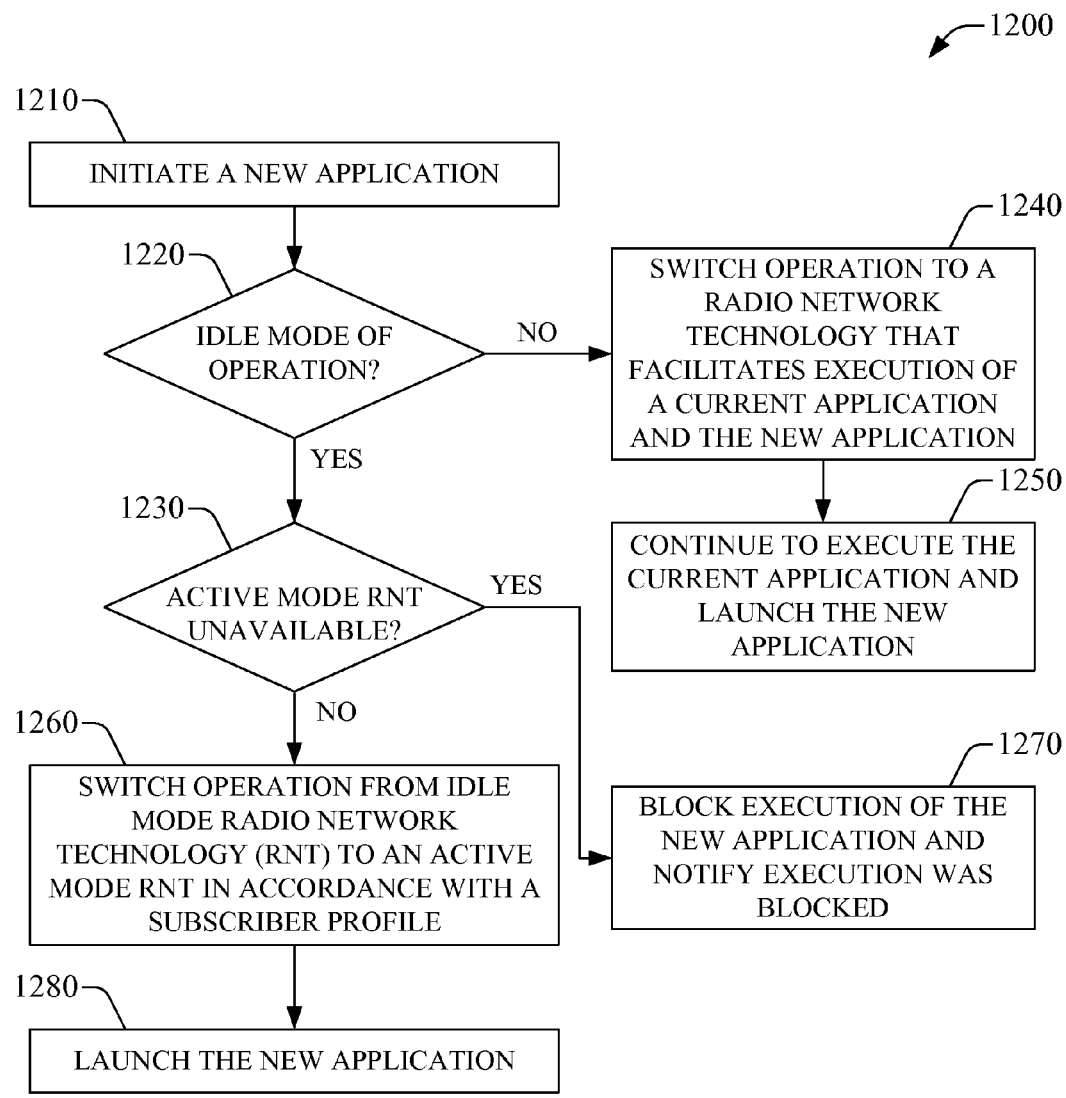
FIG. 12 presents a flowchart of an example method for managing application behavior through a subscriber profile according to aspects described herein.

FIG. 12 presents a flowchart of an example method 1200 for managing application behavior through a subscriber profile according to aspects described herein. The subject example method can be enacted by a mobile station, and it can be exploited in combination with example method 1000 or 1100. At act 1210, an application is initiated, or launched. At act 1220, it is checked whether the launch occurs in idle mode of operation. In the negative case, which entails the application is launched within active operation, at act 1240 operation is switched to a radio network technology that facilitates execution of a current application and the new application. In an aspect, the radio technology that is exploited to execute the current and new application is inferred and selected based on cost-utility analysis. Such analysis can be based at least on preference setting available for the current and new application, and on radio link conditions, and available capacity of a served sector, cell, or market. At act 1250, the current application continues to be executed while the new application is launched.

When a finding of act 1220 is that an application is launched within an idle mode of operation, it is evaluated whether active mode RNT in accordance with subscriber profile is unavailable at act 1230. In the negative case, operation is switched from idle mode radio network technology to an active mode RNT in accordance with a subscriber profile at act 1260, and the application is launched in act 1280. When the RNT in accordance with the subscriber profile is such that a subscriber that initiates the application fails to have access to, e.g., because the subscriber has not contracted services deliver in the RNT, prior to launching the application in 1280 the subscriber can be prompted to acquire service that allows access to the RNT. The latter feature can be controlled through a modifier in the subscriber profile. In the affirmative case, the active mode RNT in accordance with the subscriber profile is unavailable, execution of the new application is blocked and the blockade is notified at act 1270. Notification can be delivered via instant message, a SMS message, a multimedia message service (MMS), email message, aural or visual alarm, mechanical indication such as a vibration of a recipient mobile device, or the like.

Figure 13:
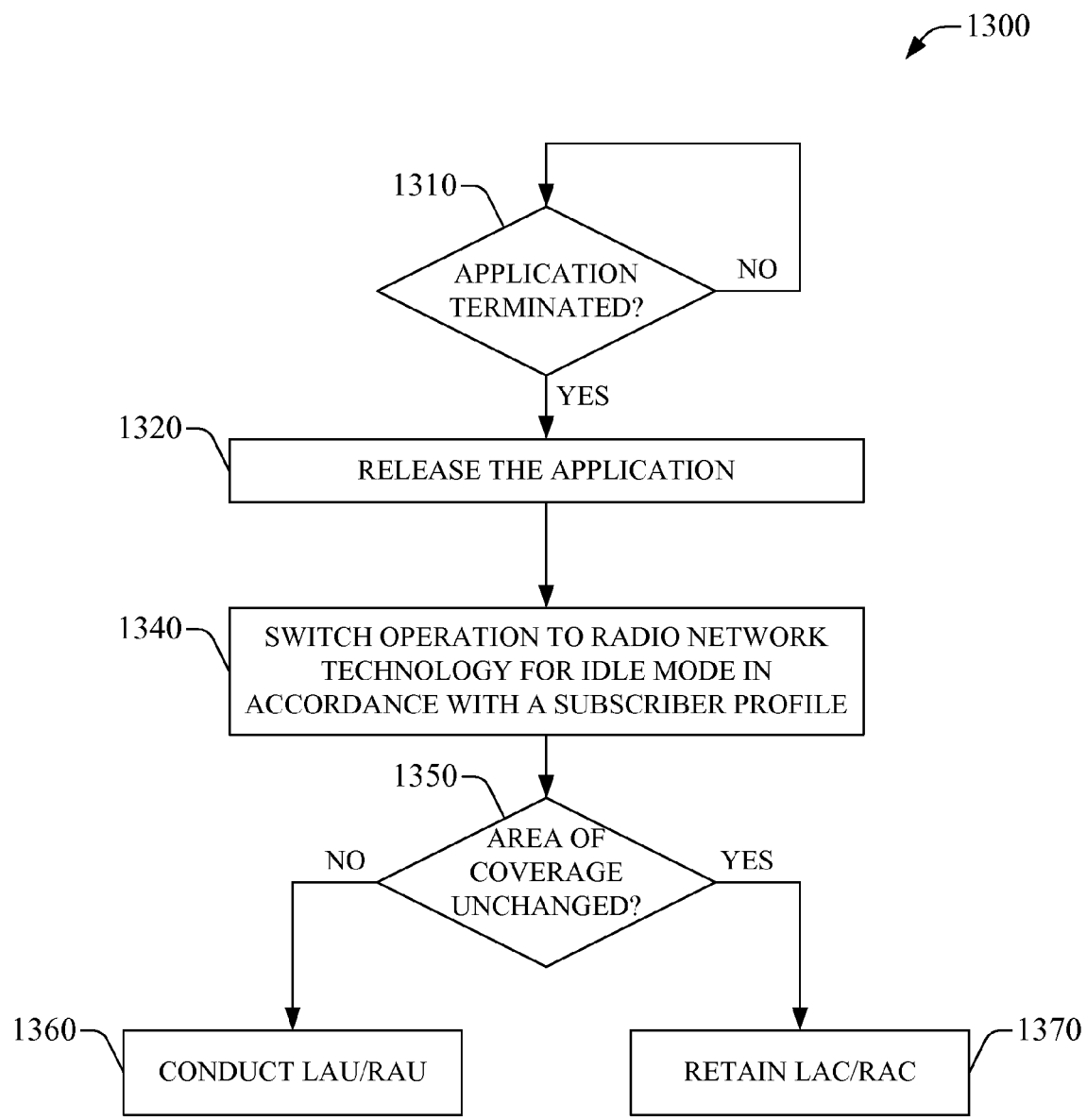
FIG. 13 presents a flowchart of an example method for releasing an application according to aspects described herein.

FIG. 13 presents a flowchart of an example method 1300 for releasing an application according to aspects described herein. A mobile station generally enacts the subject example method. In addition, the subject example method can be employed in conjunction with example method 1200. At act 1310, it is inquired whether an application is terminated or released. In case the application is terminated, either normally or faulty, the application is released at act 1320. For example, release of the application can include signaling a PDP context deactivation (e.g., dissociation with a gateway node, release of IP address) to a wireless network platform that serves at least in part a multi-technology mobile device in which the application is terminated. At act 1340, operation is switched to a radio technology network for idle mode in accordance with a subscriber profile (e.g., FIGS. 4A and 4B, and FIG. 5). It should be appreciated that switching operation to idle mode occurs when the released application is the last application to be terminated in a multi-technology mobile device. At act 1350, it is probed whether the area of coverage (e.g., sector, cell, or market) remains unchanged. In the affirmative case, a LAU or RAU procedure is conducted at act 1360 to ensure adequate paging and traffic delivery. Conversely, a LAC or RAC is retained at act 1370.

Figure 14:
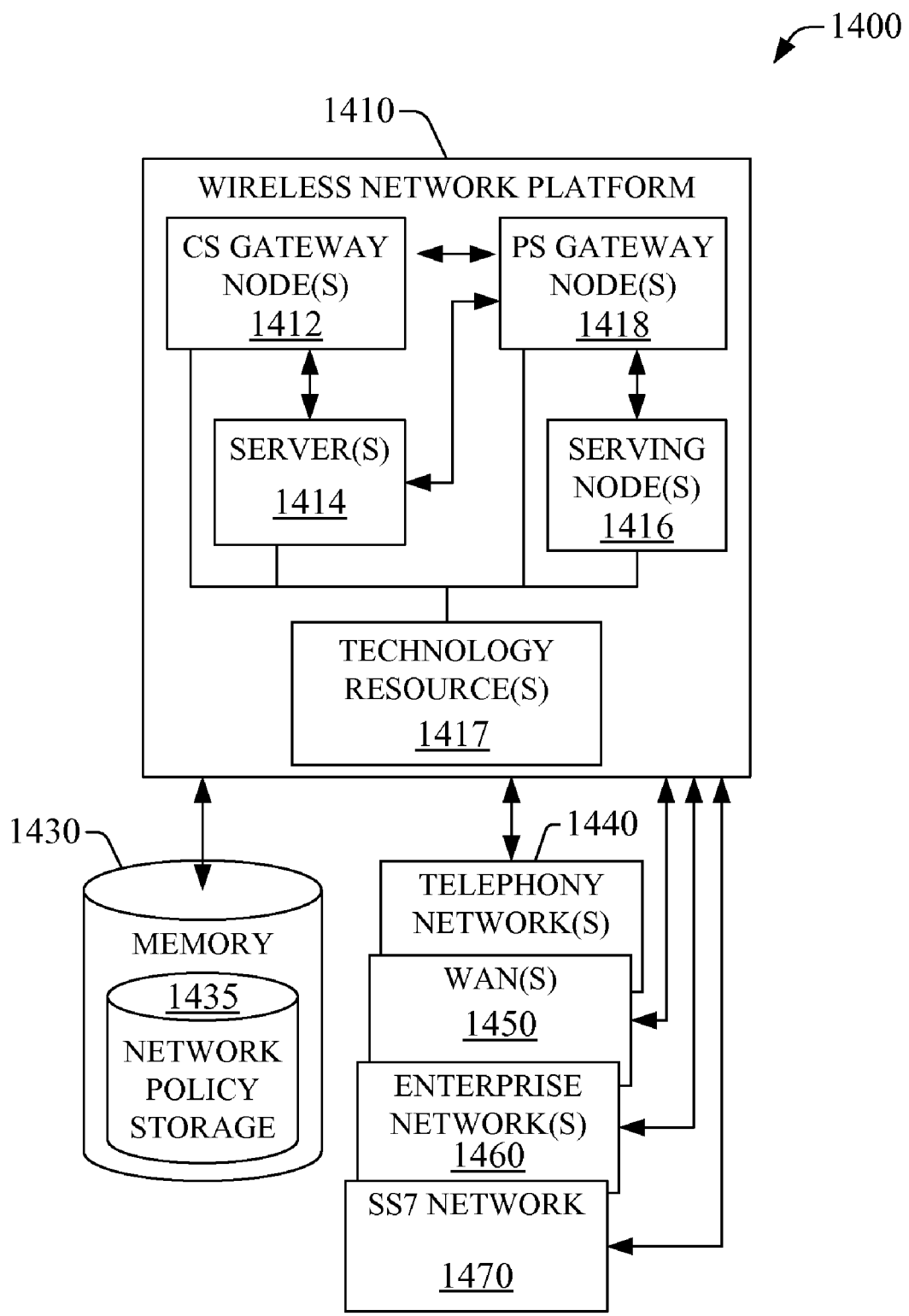
FIG. 14 is a block diagram of an example embodiment of a wireless network platform that can provide wireless coverage in accordance to various radio technology resources as dictated through network policies and subscriber profiles as described herein.

To provide further context for various aspects of the subject specification, FIG. 14 presents an example embodiment 1400 of a mobile network platform 1410 that can exploit various technology resources for telecommunication in accordance with one or more radio technology and display profiles as described herein.

Generally, wireless network platform 1410 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1410 includes CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412, which can embody at least in part gateway node(s) 310, can authorize and authenticate traffic (e.g., voice) arising from such networks. Additionally, CS gateway node(s) 1012 can access mobility, or roaming, data generated through SS7 network 1470; for instance, mobility data stored in a visited location register (VLR), which can reside in memory 1430. Moreover, CS gateway node(s) 1412 interfaces CS-based traffic and signaling and PS gateway node(s) 1018 which can embody at least in part gateway node(s) 310. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by technology resource(s) 1417 based at least in part on radio technology layer(s) (e.g., radio technology layers $215_K$) available thereto.

In the subject innovation, in addition to receiving and processing CS-switched traffic (e.g., content(s) that is part of voice-only application) and signaling, PS gateway node(s) 1418 can authorize and authenticate PS-based data sessions with served (e.g., through RAN 285) mobile devices. Data sessions can include traffic, or content(s), exchanged with networks external to the wireless network platform 1410, like wide area network(s) (WANS) 1450; enterprise network(s) 1470, which can be embodied in local area network(s) (LANs), can also be interfaced with mobile network platform 1410 through PS gateway node(s) 1418. It is to be noted that WANs 1450 and enterprise network(s) 1460 can embody, at least in part, a service network(s) like IP multimedia susbsystem. Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also includes serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For technology resource(s) 1417 that exploit packetized communication, server(s) 1414 in wireless network platform 1410 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to wireless network platform 1410 (e.g., deployed and operated by the same service provider), such as femto cell network(s) (not shown) that enhance wireless service coverage within indoor confined spaces and offload RAN resources in order to enhance subscriber service experience within a home or business environment.

It is to be noted that server(s) 1414 can include one or more processors configured to confer at least in part the functionality of macro network platform 1410. To that end, the one or more processor can execute code instructions stored in memory 1430, for example. It is should be appreciated that server(s) 1414 can include a content manager 1415, which operates in substantially the same manner as described hereinbefore.

In example embodiment 1400, memory 1430 can store information related to operation of wireless network platform 1410. In particular, memory 1430 can include a network policy storage 1435, which comprises market, subscriber, and application policies, in addition to subscriber profiles, which include network selection profiles and display profiles at the market, subscriber, and application level, as described herein. Other operational information can include provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of radio technology layers within technology resource(s) 1417; and so forth. Memory 1430 can also store information from at least one of telephony network(s) 1440, WAN 1450, enterprise network(s) 1460, or SS7 network 1470.

It is to be noted that aspects, features, or advantages of the subject innovation described in the subject specification can be exploited in substantially any wireless communication technology. For instance, Wi-Fi, $WiM_AX$, Enhanced GPRS, 3GPP LTE, 3GPP2 $UM_B$, 3GPP UMTS, HSPA, HSDPA, HSUPA,LTE Advanced. Additionally, substantially all aspects of the subject innovation as disclosed in the subject specification can be exploited in legacy telecommunication technologies; e.g., GSM.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory (e.g., memory 1086 or memory 1255) and executed by a processor (e.g., processor 1235), or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising at least one processor, a subscriber profile and signaling reception data in response to the receiving, the subscriber profile includes a network selection profile and a display profile;
   selecting, by the system, a radio technology in accordance with a set of preferences in the network selection profile that are indicative of a first priority for an idle mode of operation and a second priority for an active mode of operation; and
   displaying, by the system, a set of available radio technologies in accordance with the display profile.

2. The method of claim 1, wherein the displaying includes determining available radio technologies based on system information included within a broadcast message.

3. The method of claim 1, wherein the displaying includes determining available radio technologies including scanning a wireless environment for a pilot signal that is compatible with the set of radio technologies and determining that a signal strength and a channel quality associated with the pilot signal meet a predetermined criterion.

4. The method of claim 1, further comprising: conveying, by the system, an indication to receive an update to the subscriber profile.

5. The method of claim 4, wherein the conveying includes transmitting the indication via a text message.

6. The method of claim 4, further comprising: acknowledging, by the system, receipt of the update, wherein the acknowledging includes transmitting acknowledgement data within a predetermined multi-bit word conveyed in a radio frame.

7. The method of claim 1, wherein the selecting includes:
   switching operation to a first radio technology for the idle mode of operation specified within the subscriber profile, in response to determining that the first radio technology is available; and
   retaining a current available radio technology for idle mode operation, in response to determining that the first radio technology is unavailable.

8. The method of claim 1, wherein the selecting includes:
   detecting initiation of a new application;
   switching operation from an idle mode radio technology to an active mode radio technology associated with a type of the new application in accordance with a subscriber profile, in response to the active mode being available; and
   initiating the new application.

9. The method of claim 8, wherein the initiating includes prompting for an authorization to acquire a service that provides access to the active mode radio technology, in response to detecting that the service is not subscribed.

10. The method of claim 8, further comprising: blocking, by the system, execution of the new application, in response to the active mode radio technology being unavailable.

11. The method of claim 10, further comprising: transmitting, by the system, a notification indicating that the execution is blocked via a text message, in response to the blocking.

12. The method of claim 10, wherein the active mode radio technology is a first active mode radio technology and the method further comprises:
   switching, by the system, operation to a second active mode radio technology that facilitates execution of a current application and the new application, in response to the new application being initiated in the active mode of operation; and
   continuing, by the system, the execution of the current application.

13. The method of claim 8, further comprising:
   releasing, by the system, the new application, in response to the new application being terminated; and
   switching, by the system, operation to the idle mode radio technology subsequent to the releasing.

14. The method of claim 13, further comprising:
   conducting, by the system, a location area update procedure, in response to an area of coverage changing during the switching operation to the idle mode radio technology; and
   retaining, by the system, a location area code, in response to the area of coverage remaining unchanged during the switching operation to the idle mode radio technology.

15. A wireless device comprising:
   at least one memory storing computer-executable instructions;
   at least one processor communicatively coupled to the at least one memory that facilitates execution of the computer-executable instructions to at least:
   determine radio technology availability,
   select a radio technology to operate based at least in part on a network selection profile that includes a radio technology preference indicative of a first priority for an idle mode of operation and a second priority for an active mode of operation, and
   display a set of radio technologies available for operation, based at least in part on a display profile.

16. The wireless device of claim 15, wherein the at least one processor further facilitates the execution of the computer-executable instructions to receive the network selection profile and the display profile.

17. The wireless device of claim 15, wherein the memory retains the network selection profile and the display profile.

18. The wireless device of claim 15, wherein the radio technology preference is determined at least on a per subscriber basis.

19. The wireless device of claim 15, wherein the radio technology preference is determined based on an application type.

20. The wireless device of claim 15, wherein, for the idle mode of operation, the radio technology is determined based at least in part on a battery efficiency associated with the radio technology.

21. The wireless device of claim 15, wherein the display profile includes a first technology indicator for a first available radio technology of the set of radio technologies to be displayed in the idle mode of operation, and a second technology indicator for a second available radio technology of the set of radio technologies to be displayed in the active mode of operation.

22. The wireless device of claim 15, wherein the at least one processor further facilitates the execution of the computer-executable instructions to scan a wireless environment for a pilot signal that is compatible with at least a portion of the set of radio technologies and determines that a signal strength and a channel quality associated with the pilot signal meet a predetermined criterion.

23. The wireless device of claim 15, wherein the at least one processor further facilitates the execution of the computer-executable instructions to switch operation to a radio technology, of the set of radio technologies, for the idle mode of operation, based on the network selection profile, in response to the radio technology being available, and wherein the technology selector retains a current available radio technology for the idle mode of operation, in response to the radio technology being unavailable.

24. The wireless device of claim 23, wherein the radio technology is a first radio technology and wherein the at least one processor further facilitates the execution of the computer-executable instructions to switch operation from the first radio technology to a second radio technology in accordance with the network selection profile, in response to the second radio technology being available and an application being initiated.

25. The wireless device of claim 24, wherein the at least one processor further facilitates the execution of the computer-executable instructions to prompt to acquire a service that provides access to the radio technology, in response to detecting that the service that facilitates initiation of an application type that utilizes the second radio technology is not subscribed.

26. The wireless device of claim 23, wherein the at least one processor further facilitates the execution of the computer-executable instructions to block an execution of an application, in response to the radio technology being unavailable.

27. The wireless device of claim 26, wherein the at least one processor further facilitates the execution of the computer-executable instructions to generate a notification that indicates that the execution of the application is blocked.

28. The wireless device of claim 27, wherein the notification is delivered via a text message.

29. The wireless device of claim 23, wherein the radio technology is a first radio technology and wherein the at least one processor further facilitates the execution of the computer-executable instructions to switch operation to a second radio technology that facilitates a best-performance execution of a current application and a new application, in response to the new application being initiated in the active mode of operation.

30. The wireless device of claim 29, wherein the at least one processor further facilitates the execution of the computer-executable instructions to conduct a cost-utility analysis to determine the second radio technology.

31. The wireless device of claim 15, wherein the at least one processor further facilitates the execution of the computer-executable instructions to release an application, in response to the application being terminated.

32. The wireless device of claim 16, wherein the at least one processor further facilitates the execution of the computer-executable instructions to convey an indication to receive an update for the network selection profile and an update for the display profile.

33. The wireless device of claim 32, wherein the indication is conveyed via a text message.

34. The wireless device of claim 32, wherein the at least one processor further facilitates the execution of the computer-executable instructions to acknowledge receipt of the update for the network selection profile and the update for the display profile.

35. The wireless device of claim 15, wherein the network selection profile and the display profile are formatted in accordance with a schema that is portable among wireless devices.

36. The wireless device of claim 17, wherein the memory is a removable computer-readable storage medium that is portable among wireless devices.

37. The wireless device of claim 36, wherein the memory retains a fail-safe algorithm that is utilized for operation, in response to the network selection profile being unavailable.

38. The wireless device of claim 37, wherein the at least one processor further facilitates the execution of the computer-executable instructions to exploit the retained fail-safe algorithm, in response to the network selection profile being unavailable.

39. A computer-readable storage medium comprising computer-executable instructions that, in response to execution, cause a system, including at least one processor, to perform operations, comprising:
   receiving a subscriber profile and signaling reception data in response to the receiving, wherein the subscriber profile includes a network selection profile and a display profile;
   selecting dynamically a radio technology in accordance with a set of preferences in the network selection profile that are indicative of a first priority for an idle mode of operation and a second priority for an active mode of operation; and
   displaying a set of available radio technologies in accordance with the display profile.

* * * * *